United States Patent [19]

Weller, III et al.

[11] 4,124,891
[45] Nov. 7, 1978

[54] MEMORY ACCESS SYSTEM

[75] Inventors: Edward F. Weller, III, Glendale; Marion G. Porter, Phoenix, both of Ariz.

[73] Assignee: Honeywell Information Systems Inc., Waltham, Mass.

[21] Appl. No.: 742,814

[22] Filed: Nov. 18, 1976

[51] Int. Cl.² .............................................. G06F 13/00
[52] U.S. Cl. ................................................... 364/200
[58] Field of Search ... 364/200 MS File, 900 MS File

[56] References Cited

U.S. PATENT DOCUMENTS

| 3,806,880 | 4/1974 | Spence | 364/200 |
| 3,821,715 | 6/1974 | Hoff, Jr. et al. | 364/200 |

*Primary Examiner*—Raulfe B. Zache
*Attorney, Agent, or Firm*—Faith F. Driscoll; Nicholas Prasinos; Ronald T. Reiling

[57] ABSTRACT

An input/output processing system includes an input-/output processing unit and a read only memory (ROM) and a read/write memory. The ROM is coded to include instructions of a number of control routines. The read/write memory includes locations for storing instructions and data. The processing unit includes a plurality of registers for storing information used in developing addresses for accessing each memory. It further includes a control register for storing information for controlling accesses to the memories and a steering register which operatively couples to the control register and stores information designating which one of the memories is to be accessed. The processing unit is conditioned to exclusively OR the information in the control register with the information contained in one of the plurality of registers. By logically combining the contents of the control register and contents of another register during each address development operation, the processing unit is able to switch between the two memories as desired. When it is desired to start or stop accessing instructions from ROM, the processing unit is conditioned to perform an OR or AND operation respectively upon the contents of the control register with the contents of the other register and place the result in the control register.

27 Claims, 36 Drawing Figures

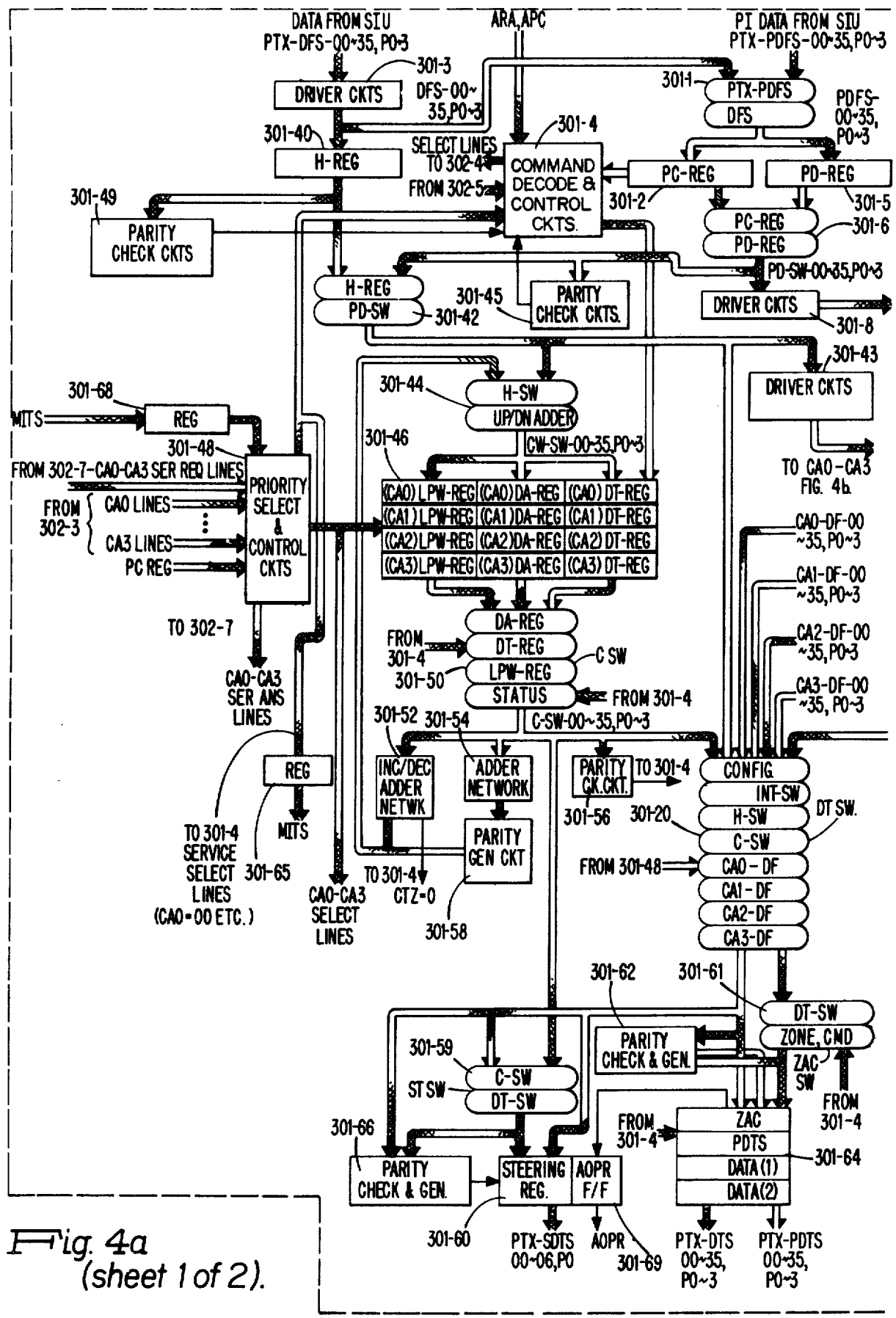
Fig. 4a (sheet 1 of 2).

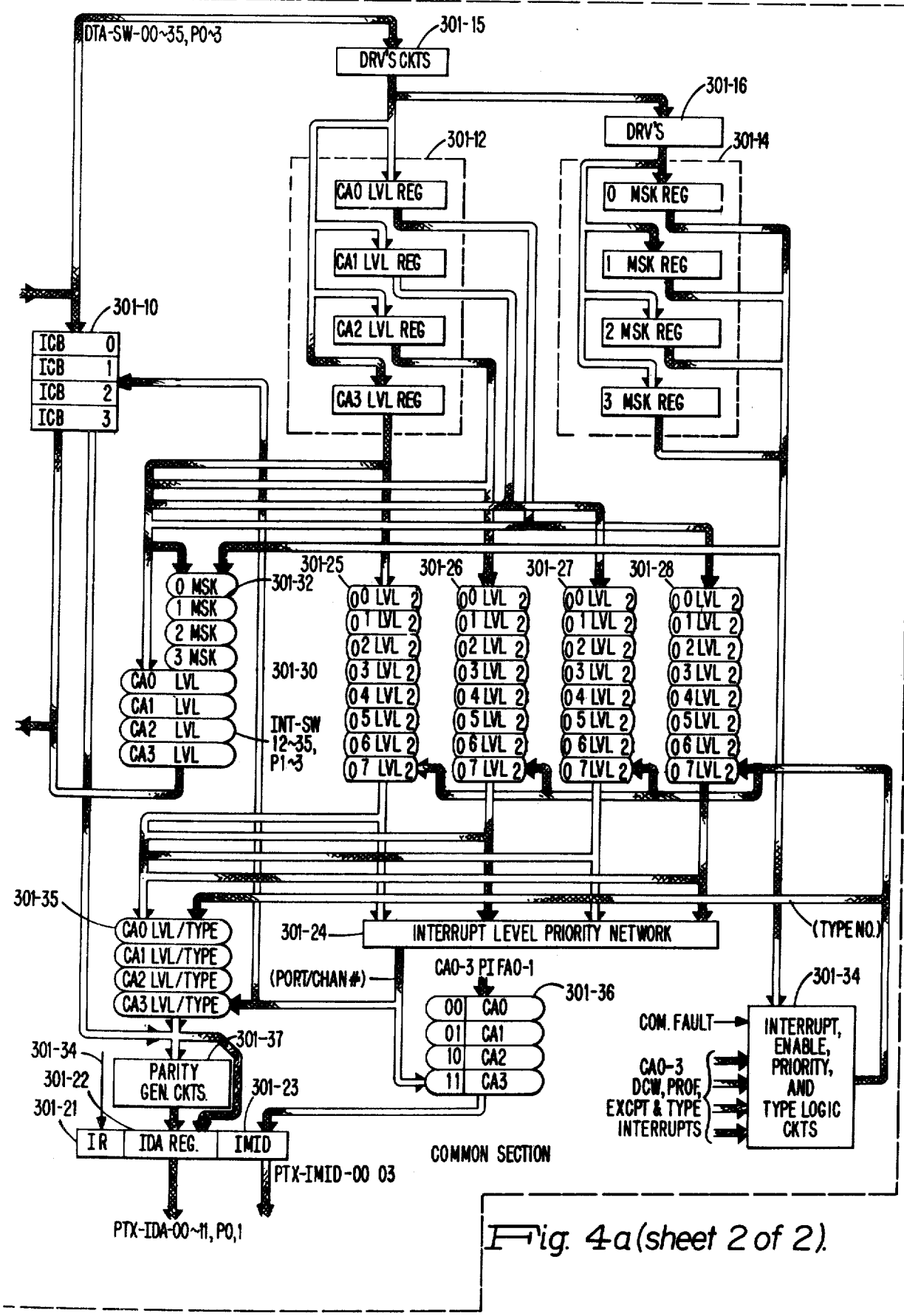
Fig. 4a (sheet 2 of 2).

| SIU PORTS A-H | ACTIVE OUTPUT PORT REQ. | AOPR | ACTIVE MODULES |
|---|---|---|---|
| | DATA TO SIU | DTS (40) | |
| | STEERING DATA TO SIU | SDTS (8) | |
| | MULTIPORT IDENT | MITS (5) | |
| | ACTIVE REQ ACCEPTED | ARA | |
| | ACCEPT READ DATA | ARDA | |
| | DATA FROM SIU | DFS (40) | |
| | MULTIPORT IDENT FROM SIU | MIFS (5) | (OMITTED ON PORTS G&H) |
| | DOUBLE PREC FROM SIU | DPFS | |
| | ACCEPT STATUS | AST | |
| | DATA INTERFACE — 600 | | |

Fig. 5a

| SIU PORTS A-F & J-L | ACCEPT PI COMMAND | APC | MODULES |
|---|---|---|---|
| | PI DATA FROM SIU | PDFS(40) | |
| | PI INTERFACE READY | PIR | |
| | READ DATA XFER REQ | RDTR | |
| | PI DATA TO SIU | PDTS(40) | |
| | READ DATA ACCEPTED | RDAA | |
| | PROGRAMMABLE INTERFACE — 601 | | |

Fig. 5b.

| SIU PORTS A-F, G-H & J-L | INTERRUPT REQ | IR | MODULES |
|---|---|---|---|
| | INTERRUPT DATA | IDA (14) | |
| | INTERRUPT MULTIPORT IDENT | IMID (4) | (OMITTED ON PORTS G&H) |
| | LOCAL MEMORY PORT SPECIFIER | LMPS | |
| | LEVEL ZERO PRESENT | LZP | |
| | HIGHER LEVEL INTERRUPT PRESENT | HLIP | (OMITTED ON PORTS A-D & J-L) |
| | INTERRUPT DATA REQUEST | IDR | |
| | RELEASE | RLS | |
| | ACTIVE INTERRUPT LEVEL | AIL (3) | |
| | INTERRUPT INTERFACE — 602 | | |

Fig. 5c.

| SIU LOCAL MEM PORTS | DATA TO MEM | DTM (40) | LOCAL MEM |
|---|---|---|---|
| | REQ IDENT TO MEM | RITM (10) | |
| | SPEC LINES TO MEM | SLTM (5) | |
| | ACCEPT PI COMMAND | APC | |
| | ACCEPT ZAC COMMAND | AZC | |
| | PI INTERFACE READY | PIR | |
| | ZAC INTERFACE READY | ZIR | |
| | READ DATA XFER REQ | RDTR | |
| | DATA FROM MEM | DFM (40) | |
| | REQ IDENT FROM MEM | RIFM (10) | |
| | DOUBLE PRECISION FROM MEM | DPFM | QUAD |
| | | | DSD |
| | READ DATA ACCEPTED | RDAA | |
| | SYSTEM CLOCK | SYS-CLK | |
| | LOCAL MEMORY INTERFACE — 603 | | |

Fig. 5d.

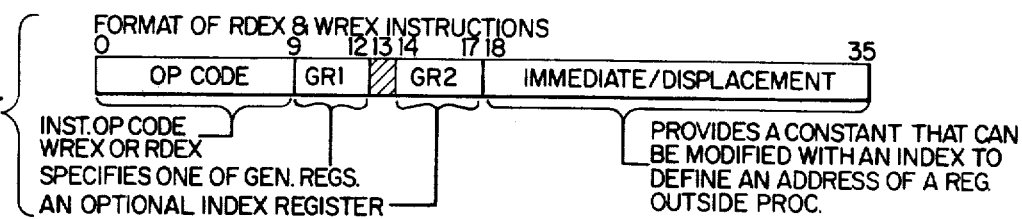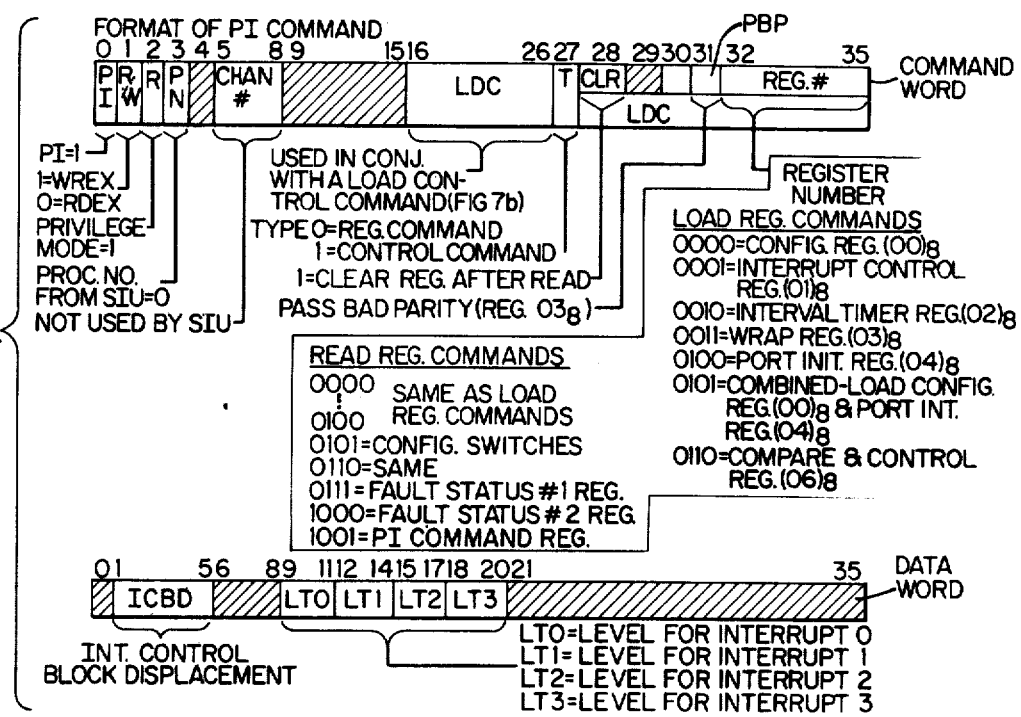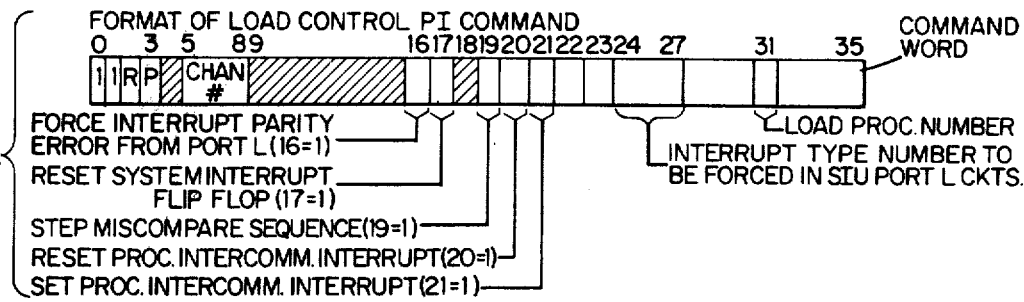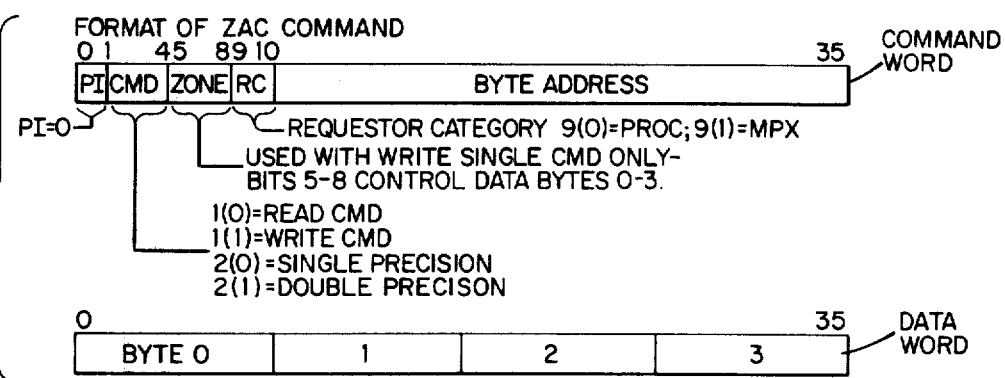

FORMAT OF REGISTER MEMORY LOAD/STORE INSTRUCTIONS

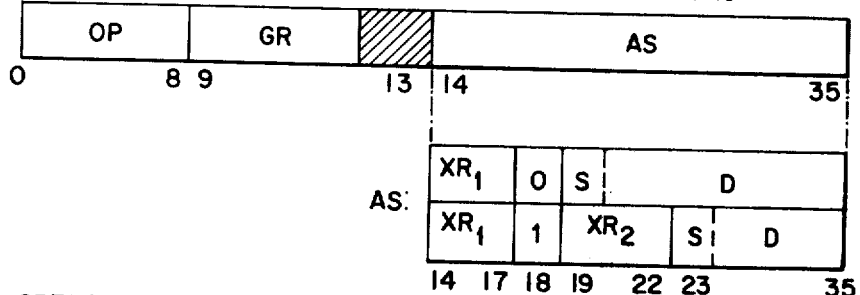

OP — OPERATION CODE
GR — A FOUR BIT FIELD WHICH SPECIFIES THE GENERAL REGISTER TO BE LOADED.
AS — ADDRESS SYLLABLE USED TO CALCULATE THE ABSOLUTE ADDRESS X. WITHIN THE ADDRESS SYLLABLE FIELDS ARE INTERPRETED AS FOLLOWS:

$XR_1$ (14:4) — THIS FIELD SPECIFIES THE GENERAL REGISTER TO BE USED AS THE FIRST-LEVEL INDEX. A VALUE OF 0 INDICATES NO FIRST-LEVEL INDEXING.

INDEX BIT (18:1) — IF THIS BIT IS 0, NO SECOND-LEVEL INDEXING IS PERFORMED, AND THE LONG DISPLACEMENT IS USED. IF THE BIT IS 1, A SECOND LEVEL OF INDEXING IS PERFORMED, AND THE SHORT DISPLACEMENT IS USED.

$XR_2$ (19:4) — IF THE INDEX BIT IS SET, THIS FIELD SPECIFIES THE GENERAL REGISTER TO BE USED AS A SECOND LEVEL INDEX.

D (19:17) — IF THE INDEX BIT IS NOT SET, D IS A 17-BIT DISPLACEMENT VALUE WHICH IS SIGN EXTENDED TO 36 BITS.

D (23:13) — IF THE INDEX BIT IS SET, THE 13 BIT DISPLACEMENT VALUE D IS SIGN EXTENDED TO 36 BITS.

Fig. 8a.

FORMAT OF OPC AND APC INSTRUCTIONS

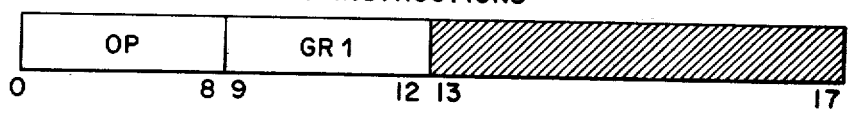

0-8 = OP CODE
GR1 = 4 BIT FIELD WHICH SPECIFIES ONE OF THE GENERAL REGISTERS.

OPC  INCLUSIVE OR GR TO PCR
THE INCLUSIVE OR OF THE CONTENTS OF GR AND PCR IS LOADED INTO THE PCR. ONLY BITS 18-22 AND 28-34 OF THE PCR ARE AFFECTED.
OPERATION =
PCR (18-22) ← (PCR (18-22) OR GR (18-22).
PCR (28-34) ← (PCR (28-34) OR GR (28-34).

APC  AND GR TO PCR
THE LOGICAL AND OF THE CONTENTS OF THE PCR AND GR IS LOADED INTO PCR.
OPERATION =
PCR (18-22) ← PCR (18-22) ⊙ GR (18-22)
PCR (28-34) ← PCR (28-34) ⊙ GR (28-34)

Fig. 8b.

Fig. 8c. FORMAT OF INSTRUCTION COUNTER (IC)

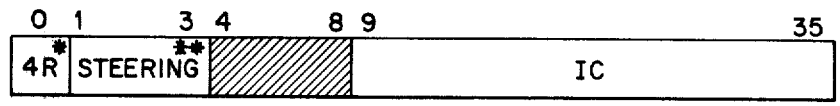

Fig. 8d. FORMAT OF PAGE TABLE BASE REGISTER (PTBR)

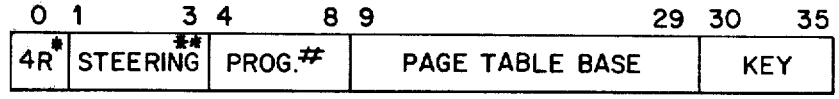

Fig. 8e. FORMAT OF CONTROL BLOCK BASE REGISTER (CBBR)

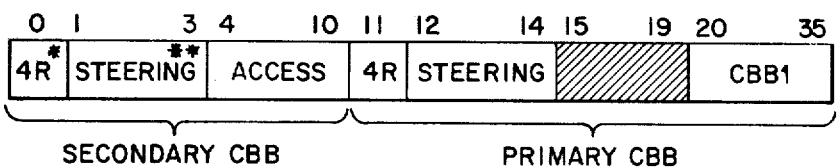

Fig. 8f. FORMAT OF PAGE TABLE WORD (PTW)

*4R = LOCAL/REMOTE. THIS BIT SPECIFIES WHETHER THE MEMORY REQUEST IS TO BE DIRECTED TO THE IOP (LOCAL) MEMORY (0) OR TO A CENTRAL SYSTEM (REMOTE) MEMORY (1).

**S1:3 = FOR REFERENCE TO LOCAL MEMORY, THE STEERING FIELD IS INTERPERTED AS FOLLOWS:

BIT 1 - LOCAL MEMORY PORT -
SELECTION OF THE LOCAL MEMORY PORT TO BE USED BY AN I/O PROCESSOR PAIR IS NORMALLY CONTROLLED BY A BIT IN AN SIU CONFIGURATION REGISTER. HOWEVER, THE OTHER LOCAL MEMORY PORT WILL BE SELECTED IF BIT 1 IS SET TO A BINARY ONE.

BIT 2 - ROM
STEERING OF LOCAL MEMORY REQUESTS TO ROM IS CONTROLLED BY THE EX OR OF BIT 2 AND PCR ROM BIT 19. A RESULT OF ONE DIRECTS A MEMORY REQUEST TO ROM. A RESULT OF ZERO DIRECTS THE REQUEST TO LOCAL MEMORY.

BIT 3 - RESERVED FOR FUTURE USE

S1:3 = FOR REFERENCE TO REMOTE MEMORY, THE STEERING FIELD IS INTERPERTED AS FOLLOWS:

BIT 1 = REMA SELECT.
SELECTION OF ONE OF TWO REMOTE MEMORY ADAPTERS IS CONTROLLED BY THIS BIT.

BITS 2-3 = REMA PORT SELECT.
BITS 2-3 SELECT THE REMOTE ADAPTER PORT.

GOES READY ON ANY CLOCK AS SOON AS THE MEMORY IS CAPABLE OF RECEIVING A NEW COMMAND

MEMORY ACCESS SYSTEM

RELATED APPLICATIONS

1. "Steering Code Generating Apparatus for use in an Input/Output Processing System" invented by Garvin W. Patterson, et al, Ser. No. 562,362, filed on March 26, 1975, now U.S. Pat. No. 4,000,487, and assigned to the same assignee as named herein.
2. "Fail Soft Memory" invented by Marion G. Porter, et al, Ser. No. 562,361, filed on Mar. 26, 1975, now U.S. Pat. No. 4,010,450, assigned to the same assignee as named herein.
3. "Processor for Input-Output Processing System" invented by Marion G. Porter, et al, Ser. No. 562,317, filed on Mar. 26, 1975, now U.S. Pat. No. 3,976,977, and assigned to the same assignee as named herein.
4. "Memory Steering in a Data Processing System" invented by William A. Shelly, Ser. No. 562,313, filed on Mar. 26, 1975, now U.S. Pat. No. 3,990,051, and assigned to the same assignee as named herein.
5. "Method of Generating Addresses to a Paged Memory" invented by Garvin Wesley Patterson, et al, Ser. No. 562,330, filed on Mar. 26, 1975, now U.S. Pat. No. 3,976,978, and assigned to the same assignee as named herein.
6. "Input-Output Processing System Utilizing Locked Processors" invented by John M. Woods, et al, Ser. No. 741,632, filed on Nov. 15, 1976 and assigned to the same assignee as named herein.

BACKGROUND OF THE INVENTION

1. Field of Use

The present invention relates to data processing systems and more particularly to a system which facilitates memory access.

2. Prior Art

In current data processing systems, it is necessary to provide storage for important control routines as for example, initialize and start-up routines. Moreover, it is important to ensure that the control routines remain intact and are only accessed by certain routines.

One way of providing the above protection in some systems is to store important control routines nonalterable storage and to include checks to ensure detection of illegal accesses.

Normally, the permanent storage is included as either the upper or lower addressing range of a read/write memory. Stated differently, the permanent storage is included as a part of the read/write memory.

It has been found that the routines included in the permanent storage would be run within a fixed address range corresponding to the extent of permanent storage. When it is required to have a routine access information outside the permanent storage area such as to process an exception condition or interrupt, it is necessary to provide additional registers which are preconditioned to indicate the source of the exception condition. The system is then required to execute a common routine for processing the exception, and then branches to a predetermined address specified by another register which would process the exception condition. Following such processing, the system returns control to the main routine via a return instruction sequence.

In the above arrangement, it is necessary to provide appropriate checking circuits to insure that all accesses made to the control routines are authorized. Additionally, it is also necessary to provide for offsetting the address values of instructions included within the routines in order to ensure that accesses are made only to the proper areas of memory.

The significant disadvantages of the above arrangements are the lack of flexibility in accessing the different types of memories and the attendant inefficiencies resulting in switching between the memories. Another disadvantage is the requirement for additional checking circuits for signaling improper accesses.

Accordingly, it is a primary object of the present invention to provide a system for facilitating accessing information from a number of memory units.

It is a more specific object of the present invention to provide a system which enables access to a number of memories in a manner which ensures detection of improper memory accesses.

SUMMARY OF THE INVENTION

The above and other objects of the present invention are achieved in a preferred embodiment of an input-/output system which includes an input/output processing unit and at least first and second memory units. The first memory is a read only memory (ROM) which is coded to store instructions of control routines. The second memory is a read/write memory for storing instructions and data required to control system operation.

The processing unit includes a plurality of registers for storing information used in address development, a control register for storing information for controlling accesses to the ROM and a steering register for designating which one of the memories is to be accessed. The processing unit further includes logic circuits which couple to the control register the plurality of registers and steering register. During the execution of instructions, each time the processing unit encounters an instruction specifying a memory reference, the logic circuits are operative to exclusively OR the contents of the control register with the contents of a register designated by the instruction and apply the result to the steering register. This alters the steering register contents so as to switch operation to the desired memory.

Each time the processing unit desires to begin or discontinue further accesses to or from one of the memories, it is operative to perform a logical OR and a logical AND operation respectively upon the contents of the control register with the contents of one of the plurality of registers and store the result in the control register. The OR operation forces a predetermined one of the bits of the control register to a predetermined state (i.e., binary ONE). This designates that access is to be made to the ROM. The AND operation forces the predetermined one of the bits of the control register to a different predetermined state (i.e., binary ZERO). This designates that accesses are no longer to be made to the ROM.

During exception and interrupt processing, the processing unit accesses the contents of a control block base register which contains information for designating the source of instructions. To alter the memory source of instructions, the processing unit in a similar fashion exclusively ORs the contents of this register with another register coded to contain an appropriate value which results in switching to the desired memory.

Thus, the processing unit is able to quickly and efficiently switch between memories. Modification of the control register contents is permitted to take place only when the processing unit is in a privileged or master mode of operation. Accordingly, when user program routines being executed by the processing unit attempt to gain access to the control routines in the ROM such access is inhibited. The reason is that the contents of the control registers can be accessed only by instructions executed with the processing unit placed in the privileged or master mode.

The above arrangement enables switching between ROM and read/write memory to take place with minimum amount of additional circuits.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4a and 4b show in greater detail a multiplexer unit of FIG. 1.

FIG. 5a shows the lines which comprise a data interface employed in the system of FIG. 1.

FIG. 5b shows the lines which comprise a programmable interface employed in the system of FIG. 1.

FIG. 5c shows the lines which comprise an interrupt interface employed in the system of FIG. 1.

FIGS. 5d and 5e show the lines of a local memory and notification interfaces employed in the system of FIG. 1.

FIG. 6 illustrates the formats of different program instructions utilized in accordance with the present invention.

FIGS. 7a through 7c illustrate the formats of commands.

FIGS. 8a through 8f illustrate the formats of certain instructions and registers.

DESCRIPTION OF THE PREFERRED EMBODIMENT

GENERAL DESCRIPTION

Figure 1:
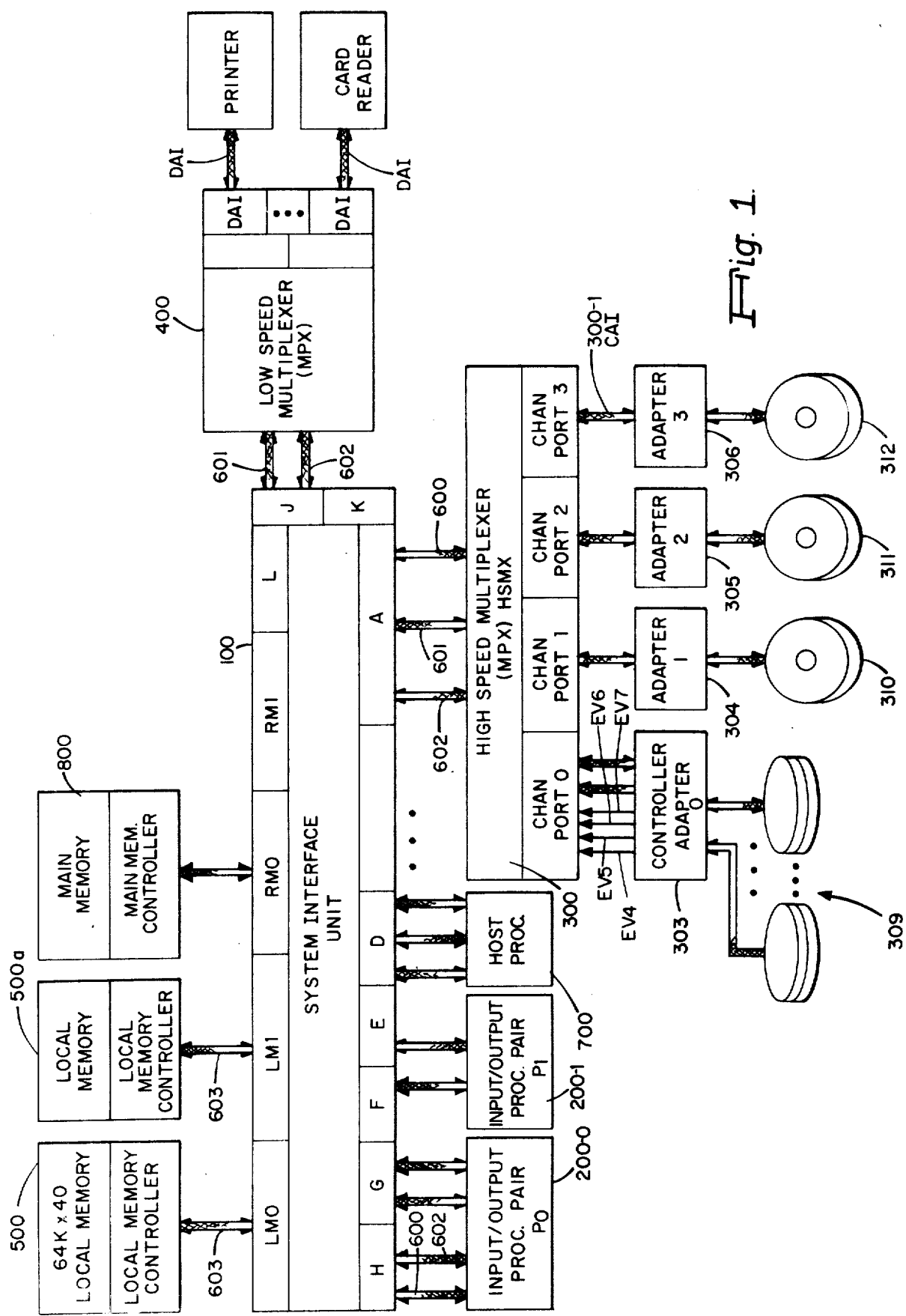
FIG. 1 illustrates in block diagram form an input/output system employing the principles of the present invention.

As seen from FIG. 1, the system which incorporates the principles of the present invention includes two input/output processor (IOPP) pairs 200-0 and 200-1, a system interface unit (SIU) 100, a high speed multiplexer (HSMX) 300, a low speed multiplexer (LSMX) 400, a host processor 700, a local memory module 500, and a main memory module 800. Different ones of these modules connect to one of a number of ports of the system interface unit 100 through a plurality of lines of different ones of different types of interfaces 600 through 603. More specifically, the two input/output processors of logical pair 200-0 and 200-1, the host processor 700, and high speed multiplexer 300 connect to ports G, H, E, F, D, and A, respectively, while the low speed multiplexer 400, memory modules 500 and 800 connect to ports J, LMO, and RMO, respectively.

The input/output system of FIG. 1 can be viewed as including a number of "active modules," "passive modules," and "memory modules." The IOP processor 200, host processor 700, and high speed multiplexer 300 serve as active modules in that each has the ability to issue memory commands. The active modules normally connect to ports A through H. A plurality of passive modules are connected to three ports J, K, and L. These modules correspond to the low speed multiplexer 400 and the system interface unit 100 and are units capable of interpreting and executing commands applied to the lines of interface 601 as described herein. The last group of modules constitutes local memory modules and remote memory modules (not shown) such as those of the main system (not shown) which are capable of executing two different types of commands applied to the lines of interface 603.

The input/output system of FIG. 1 normally functions as an input/output subsystem responsive to input/output instructions issued by host processor 700 which normally connects to port D via the interface 600, 601, and 602 which correspond to a data interface, a programmable interface, and an interrupt interface, respectively, described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiatess and terminates channel programs required for the execution of input/output instructions, processes interrupt requests received from the system interface unit 100 and directly controls unit record peripheral devices coupled to low speed multiplexer 400. The processor pair 200-0 connects to ports G and H via the data interface 600 and interrupt interface 602.

The low speed multiplexer 400 which for the purposes of the present invention can be considered conventional in design, provides for attachment of low speed peripheral devices via peripheral adapters each of which couples to the lines of a device adapter interface (DAI). The interface and adapter may take the form of those units described in U.S. Pat. No. 3,742,457, which is assigned to the assignee of the present invention. The low speed devices include card readers, card punches, printers and consoles. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 303 to 306. Each of the channel controller adapters 303 through 306 which connects to a maximum of 16 devices, in turn, connects to a different one of the ports or channels 0 through 3 via the interface lines of a channel adapter interface (CAI) 301-1. The high speed multiplexer 300 connects to port A corresponding to a data interface 600, a programmable interface 601, and an interrupt interface 602.

For the purposes of the present invention, each of the channel controller adapters 303 through 306 may be considered conventional in design and take the form of controller adapters described in the aforementioned Pat. No. 3,742,457.

As mentioned previously, each of the modules connects to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

THE PORT INTERFACES

Before describing in greater detail different ones of the modules of FIG. 1, each of the interfaces 600 through 603 referred to previously will now be described with reference to FIGS. 5a through 5d.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed a "dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST). The description of the interface lines is given in greater detail in the section to follow.

| DATA INTERFACE LINES | |
|---|---|
| Designation | Description |
| AOPR | The active output port request line is a unidirectional line which extends from each of the active modules to the SIU 100. When set, this line signals the SIU that the module requests a transfer path over which a command or data is to be transferred. |
| DTS 00-35, P0-P3 | The data to SIU lines are a four byte wide unidirectional path (four 10 bit bytes) that extend between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows:<br>a) The state of bit 0 - The type of command applied to the DTS lines (whether the command is a programmable interface command or a memory command).<br>b) Bits 1-4 are coded to indicate which one of the modules is to receive and interpret the command (commands are interpreted only by memory modules and programmable interface commands shall be interpreted by all modules except input/output processors 200-0).<br>c) The state of bit 5 indicates whether one or two words of the command information is to be transferred between the requesting active module and the designated receiving module (one word specifies a single precision transfer and two words specifies a double precision transfer).<br>d) The state of bit 6 indicates the direction of transfer between the requesting module and the designated receiver module.<br>e) Bit P is a parity bit generated by the requesting active module which is checked by apparatus included within the SIU 100. |
| MITS 0-3, P | The four multiport identifier to SIU lines extend from the active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The data from SIU lines are another set of data path lines which are a four byte wide unidirectional path (four 10 bit bytes) which extends from the SIU to each active module. This set of lines is used by the SIU 100 to convey read type data to a designated one of the active modules. |
| MIFS 0-3, P | The four multiport identifier from SIU lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS lines. |

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog." The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extends from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extend from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

A further interface is the interrupt interface 602 of FIG. 5c which provides for interrupt processing by the input/output processor pairs 200-0 and 200-1. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog."

The interface includes an interrupt request line (IR), a plurality of interrupt data lines (IDA 00-11, P0-P1), and a plurality of interrupt multiport identifier lines (IMID 00-03) for modules connected to ports A through L. For modules connected to ports G and H, the interrupt interface further includes a local memory port specifier line (LMPS), a level zero present line (LZP), a higher level interrupt present line (HLIP), an interrupt data request line (IDR), a release line (RLS), and a plurality of active interrupt level lines (AIL0-2). As seen from FIG. 5c, the interrupt interface ports G and H do not include an interrupt multiport identifier line. The description of the interrupt lines is given in greater detail herein.

| INTERRUPT INTERFACE LINES | |
|---|---|
| Designation | Description |
| IR | The interrupt request line extends from each module to the SIU 100. When set, this line indicates to the SIU that it requires service. |
| IDA 0-3, P0 IDA 4-11, P1 | The interrupt data lines extend from an active module to the SIU 100. These lines are coded to contain control information required to be transferred to the input/output processor. These bits are coded as follows:<br>a) The state of bit 0 specifies to the SIU 100 which of the two processors (i.e., processor number) is to process the interrupt request.<br>b) Bits 1–3 are coded to indicate the priority or level number of the interrupt request to the SIU 100.<br>c) Bit P0 is a parity bit for bits 0–3.<br>d) Bits 4–8 are coded to provide a portion of an address required to be generated by an input/output processor for referencing the correct procedure for processing the interrupt (i.e., an interrupt control block number ICBN).<br>e) Bit P1 is a parity bit for bits 4–11. |
| IMID00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor. When set, this line indicates that there is a highest priority (level 0 interrupt) request being directed to a processor by the SIU 100. |
| HLIP | The higher level interrupt present line extends from the SIU to each input/output processor. When set, this line indicates that there is an interrupt request having a higher level or priority than the procedure or process being executed by the processor. |
| IDR | The interrupt data request line extends from the input/output processor to the SIU 100. When set, this line indicates that interrupt data is to be sent to the processor on lines DFS by the SIU 100. |
| RLS | The release line extends from each input/output processor to the SIU 100. This line, when set, indicates that the processor has completed execution of the current procedure. |
| AIL 0-2 | The active interrupt level lines extend from the SIU to the input/output processor. These lines are coded to designate the interrupt level number of the procedure being executed by the processor. |
| LMPS | The local memory specifier line extends from the SIU to an active module. It reflects the state of one bit of the contents of an SIU configuration register specifying the local memory port considered to be logical local memory o. This line is used in the generation of "steering" information to specify which local memory port (LM0 or LM1) is to be used when an I/O processor wants to access local memory. |

A further set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed "a dialog." The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface read one (PIR), a ZAC interface ready line (ZIR), a read data transfer request line (PDTR), a plurality of data from memory lines (DFM 00-35, P0-P3), a plurality of request identifier from memory lines (RIFM 0-7, P0-P1), a double precision from memory line (DPFM), a QUAD line, a read data accepted line (RDAA) and a system clock line (SYS-CLK). A similar interface is used for connecting the main memory module 800 to the SIU 100.

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines is given in greater detail herein.

| LOCAL MEMORY INTERFACE LINES | |
|---|---|
| Designation | Description |
| DTM 00-35, P0-P3 | The data path lines constitute a four byte wide unidirectional path (36 information lines and four odd parity lines) that extends from the SIU 100 to the local memory 500. These lines are used to transfer memory or programmable interface commands to the local memory 500. |
| RITM 0-3, P0 RITM 4-7, P1 | The requestor identifier to memory lines constitutes two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows: a) Bits 0-1 are port number selection bits coded to specify which port or subchannel within the attached module is to receive or interpret the memory command sent to the module. b) Bit 2 is a read/write to memory bit which is included in the steering control information received from the active module which is forwarded by the SIU to the local memory 500 when a new command is sent to the memory by the SIU 100. The state of this bit indicates the direction of data transfer. c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/ZIR | The programmable interface ready line/ZAC interface ready line extends from the local memory module 500 to the SIU 100. When set, each line signals the SIU 100 that the local memory module 500 is capable of accepting a programmable interface (PI)/memory (ZAC) command. |
| RDTR | The read data transfer request line extends from the local memory module 500 to the SIU 100. This line, when set, indicates that the read type data previously requested by a ZAC or PI command is available along with the necessary control information to be sent to the module requesting the data. |
| DFM 00-35, P0-P3 | The data from memory lines are a four byte wide unidirectional bus which extends from the local memory module 500 to the SIU 100. These lines are used to return read requested type data to an active module via the SIU 100. |
| RIFM 0-3, P0, RIFM 4-7, P1 | The two groups of requestor identifier from memory lines extend from the local memory module 500 to the SIU 100. These lines are coded for directing the read data back from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows:<br>QUAD DPFM<br>0 0 one word single precision<br>0 1 two words, double precision<br>1 X (don't care) four words |
| DSD | The read data/status identifier line extends from the local memory module 500 to the SIO. The state of this line signals the SIU 100 whether the information applied to the lines DFM is read data or status information when line RDTR is set. When set, the line indicates status information of one or two words (QUAD=O) is being transferred. When set to a binary ZERO, the line signals that up to four words of data are being transferred, the number being specified by the coding of lines QUAD and DPFM. |
| RDAA | The read data accepted line, as mentioned in connection with the programmable interface, extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor to synchronize the operations of each memory module from a common system clock source. |

Figure 5E:
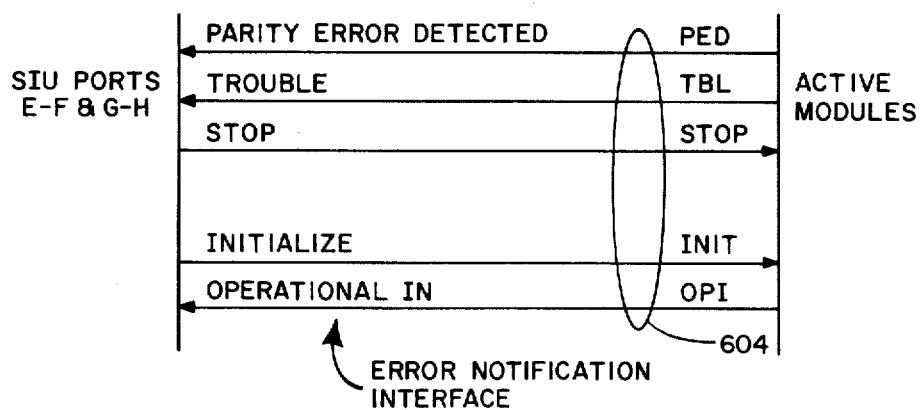

A last set of interface lines is shown in FIG. 5e. In accordance with the present invention, several of these lines signal certain conditions as for example error conditions and operational conditions. More importantly, these lines enable the SIU 100 to control the operation of the processor pair in accordance with the present invention.

As seen from FIG. 5e, the interface includes a parity error detected line (PED), a trouble line (TBL), a STOP line, an initialize line (INIT), and an operational in line (OPI).

The description of the interface lines is given herein in greater detail.

| ERROR NOTIFICATION INTERFACE LINES | |
|---|---|
| Designation | Description |
| PED | The parity error detected line is a single line which is coded to indicate to the SIU 100 the logical "OR" of all the parity error detector circuits internal to the attached I/O processor. This line is useed by the SIU 100 as an indication that a level zero interrupt is to be issued to the processor. |
| TBL | The trouble line, when set by the processor, notifies the SIU 100 that it has encountered an exception condition while in level zero or a time-out during the self test. |
| STOP | A line from the SIU 100 to a module which, when set, indicates that the module should cease all activity. |
| INIT | A line from SIU 100 to a module which, when set, causes the module to assume the initialized state. |
| OPI | A set/complement pair of lines to the SIU 100 from a module. The pair is coded to indicate when the module is active, is powered up, and is ready to generate or accept commands. |

Having described the different types of interfaces utilized by the modules of FIG. 1, each of the modules pertinent to the understanding of the present invention will now be described in greater detail.

DETAILED DESCRIPTION OF INPUT/OUTPUT PROCESSOR 200

Figure 2:
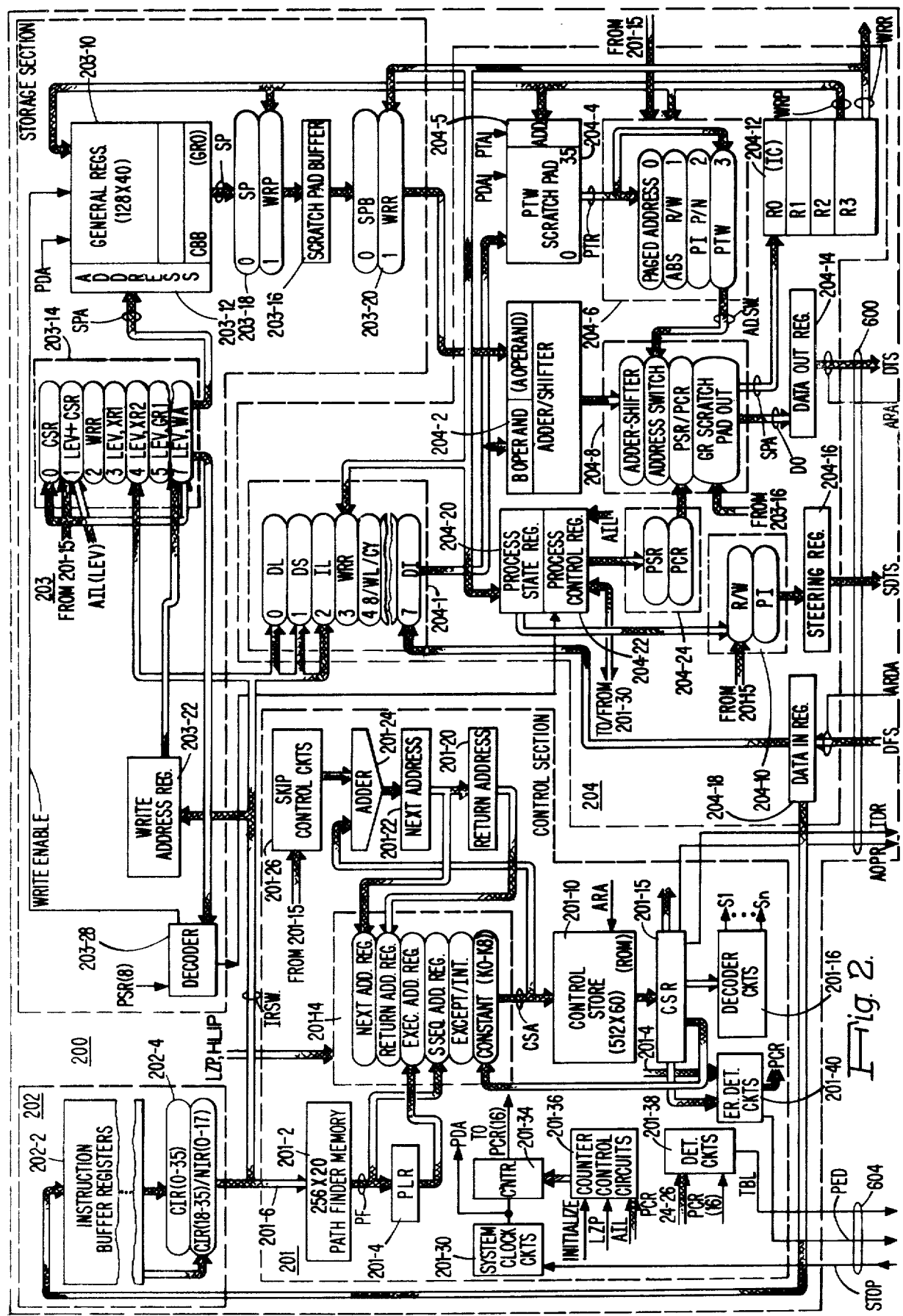
FIG. 2 shows in greater detail, an input/output processing unit of FIG. 1.

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10.

CONTROL STORE SECTION 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as other operand input, signals from skip control of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" by means not shown with interrupt inhibit signals from a process control register 204-22 and the result is ORed by means not shown with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exceiption/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 2, required for establishing appropriate memory cycles of operation for control section as well as timing signals for operating other sections of processor 200 and the other modules of the system of FIG. 2 are provided by clock circuits included within a block 201-30. The clock circuits receive as an input the STOP line which, when in a binary ONE state, inhibits further operation of control section 201. The block 201-30 includes circuits for signalling the SIU 100 via the OPI line that the processor 200 is operational. For the purposes of the present invention, the clock circuits as well as the other circuits of FIG. 2 can be considered conventional in design and can, for example, take the form of circuits disclosed in the publication titled "The Integrated Circuits Catalog for Design Engineers," by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that, as in most microprogrammed control machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al, which is assigned to the assignee of the present invention. Reference may also be made to other ones of the documents referenced in the introductory portion of the specification.

Instruction Buffer Section 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

Storage Section 203

As seen from FIG. 2, this section comprises a scratch pad memory containing eight sets or groups or registers associated with eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9-12 or bits 14-17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop, not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" and by means not shown with the decoder output signal and is used to generate an exception signal on another output line which is applied as an input to process control register 204-22 and causes selection of the exception-interrupt position of switch 201-14. As explained herein, this prevents alteration of the contents of the process state register location (GRO) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) − 16 (ECB# + 1). Each ECB includes values for loading the PSR, IC, and PTBR registers in addition to a saving area pointer in ECB#0 which points to a stack area for storing information pertinent to the current process before the processor 200 enters the exception routine.

The address of an interrupt control block (ICB) equals the control block base (CBB) + 16(ICB#). The ICB# is obtained from the interrupt word as explained herein. Similarly, the ICB is a four word block and it contains values for the PSR, IC, GR14, and PTBR registers.

Formats of Instruction and Processor Registers

FIGS. 8a and 8b illustrate the formats of certain instructions in accordance with the present invention. Referring to FIG. 8a, it is seen that the different types of memory reference instructions, such as load and store instructions, have a format which includes a 9 bit op code field, a 4 bit field specifying a general register and a 12 bit address syllable field used to calculate an absolute address.

The address syllable field AS of each memory reference instruction has a format which includes an XRI field coded to specify a general register location in scratch pad memory 203-10 to be used as a first level index, an index bit which is set to a binary ONE, an XR2 field coded to specify a general register location in scratch pad memory 203-10 to be used as a second level index and a 13 bit displacement value D which is sign extended to 36 bits. By having all memory reference instructions include double index references, it simplifies other operations as explained herein.

FIG. 8b illustrates the format of two master mode special register instructions in accordance with the present invention. The two instructions perform logical operations on the process control register 204-22. As seen from FIG. 8b, each instruction has a format which includes a 9 bit op code field and a 4 bit field which specifies one of the general register locations of scratch pad memory 203-10. The APC instruction performs an AND operation upon bits 18-22 and 28-34 of register 204-22 while the OPC instruction performs an OR operation upon the same bits.

FIGS. 8c through 8e illustrate the formats of certain ones of the processor previously described (i.e., the instruction counter, page table base and control block base registers). FIG. 8f illustrates the format of the page table words stored in PTW scratch pad memory 204-4.

It will be noted that bit 0 in each format is coded to specify whether the memory request is to be directed to local memory (i.e., set to a binary ZERO) or to a central system remote memory (i.e., set to a binary ONE). Also, bits 1-3 of each format constitute a steering field which is coded as follows.

For references to local memory, the steering bits are coded as follows:
  bit 1 — defines which local memory port is to be used by an I/O processor pair;
  bit 2 — is a ROM bit which defines whether the memory request is directed to the ROM or the read/write memory. A result of a binary ONE directs the memory request to the ROM while a result of binary ZERO directs the request to the read/write memory; and,
  bit 3 — is not used.

For references to remote memory, the steering field is coded as follows:
  bit 1 — defines which of two remote memory adapters is to be used; and,
  bits 2-3 — define which remote adapter port is to be used.

Processing Section 204

This section performs all of the arithmetic and logic operations required to process program instructions. The section 204 includes an adder/shifter unit 204-1 capable of performing arithmetic, shift, and logic operations upon a pair of 36 bit operands. The results produced by either an adder portion or shifter portion of unit 204-2 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-2 can be considered conventional in design. Also, the unit 204-2 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e., adder/shifter 204-2, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20, as mentioned, is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of exceptions which include the following.

| PCR BIT POSITION | EXCEPTION TYPE |
| --- | --- |
| 0 | Operation not complete; no response from SIU on lines ARA or ARDA. |
| 1 | Page address bounds fault (key check). |
| 2 | Page access fault. |
| 3 | Page not resident in memory. |
| 4 | Illegal operation (invalid instruction, illegal slave instruction, or illegal slave operation). |
| 5 | Process timer run out. |
| 6 | Overflow. |
| 7 | Lockup fault. |
| 8 | Address misalignment. |

The term "fault" does not necessarily mean the occurrence of a hardware failure, but includes programming errors, etc.

Bit positions 9-12 store the parity errors detected per data path substrate. Bit position 13 indicates when a parity error is detected in the Data In register. Bit positions 14-15 store indications of parity errors detected per control store and pathfinder memory. Bit 15 signals no response to the level zero interrupt present. Bit positions 23-26 identify the processor number and level received from the PNID and AIL lines. Bit position 27 is an interrupt inhibit bit position while bit positions 28-35 store interrupt request bits which, when set to a binary ONE, indicate an interrupt request to a level corresponding to the bit position (i.e., bit 28 = level 0). The bit positions 27-35 are loaded by program instruction from the bank of registers of block 204-12 via output bus WRR. Bit position 35 is always set to a binary ONE.

The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

In the case of a PI command, the steering information is generated as follows: bit 0 is forced to a binary ONE for a PI command; bits 1-4 correspond to bits 0-3 of register 204-20; and bits 5-6 correspond to bits of one of the fields of the microinstructions which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table word storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selector switch 204-6 are used to provide the memory or PI command. More specifically, positions 0 and 1 of address switch 204-6, when selected by an address control field of a microinstruction word stored in register 201-15, generates the R/W memory command information which includes bits 0-8 coded in accordance with predetermined fields of the microinstruction word and bits 9-35 coded to correspond to either paged address information from memory 204-4 (position 0) or absolute address bits applied to output bus WRP by the working registers of block 204-12 (position 1). When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or sub-channel within the module, bit 3 is coded to specify the processor pair number supplied by the SIU 100, bit 4 is a ZERO and bits 9-35 equal bits 9-35 of bus WRP which correspond to the absolute address of the PI command.

Error Detection Circuits 201-32 — FIG. 2

In addition to the above described circuits, each IOP processor includes error detection circuits conventional in design, such as parity check circuits, which perform checks on the various storage sections of each input-/output processor as explained herein. The block 201-32 also supplies signals to the various lines of interface 604 as explained herein.

Although shown as a single block, it will be appreciated that the parity generation and check circuits are located at various points throughout the processor 200. For example, the four parity bits for data stored in general register locations of scratch pad 203-10 are generated by circuits connected to the input bus to the scratch pad 203-10. Parity circuits connected to SPB register output check the output signls for correct parity. Similarly, parity generation circuits generate parity for signals at the output of B operand switch 204-1 to be written into the PTW scratch pad 204-4. The parity of each byte read out from PTW scratch pad 204-4 is checked by parity check circuits located at the input to address switch 204-6.

Additionally, the control store 201-10 and pathfinder memory 201-2 include parity check circuits for detecting the presence of single bit failures in memory locations. The occurrence of an error sets the corresponding control store bit (i.e., bit positions 14-15) of PCR register 204-22. Further, parity circuits connected to the Data In register 204-18 check all data and instructions clocked into the Data In register 204-18. A parity error detected on data from the SIU 100 sets the corresponding substrate parity error bit (i.e., bit positions 9-12) for the bad byte and the Data In bit position 13 of PCR register 204-22.

The block 201-32 includes OR logic circuits which are connected to receive signal indications of the parity error bits stored in PCR register 204-22. One group of these circuits provides a resultant signal to line PED which corresponds to the logical OR of the parity error signals.

Counter and Detector Circuits

A last group of circuits pertinent to the operation of the present invention includes the circuits of blocks 201-34, 201-36, and 201-38. Block 201-34 includes a nine stage counter, conventional in design, controlled by the circuits of block 201-36. The counter serves as a "level zero" timer which detects when processor 200 does not respond to an interrupt request within a period equal to twice the operation not complete time interval.

In greater detail, the counter is initialized to a zero state by the circuits of block 201-36 as long as the LZP line remains at a binary ZERO. When the LZP line switches to a binary ONE, the circuits of block 201-36 remove the initialize signal and the counter starts running or increases its count by one in response to each PDA signal from the circuits of block 201-30. When it reaches a maximum count (all binary ONES) and the AIL lines still have not been switched to a ZERO state, the counter generates an output which forces bit position 16 of the PCR register 204-22 to a binary ONE.

The incrementing of the counter of block 201-34 is stopped by the circuits of block 201-36 when either the AIL lines are switched to ZERO or the LZP line is switched to ZERO by SIU 100. The signals also initialize the counter. Lastly, the circuits 201-36 apply the signals on the INIT line as an input to switch 201-14.

When the SIU 100 forces the INIT line to a binary ONE, this initializes or clears the contents of the various registers within the processor 200 (i.e., PCR register 204-22). When reset, the processor 200 begins execution of an initialization routine in control store 201-10.

The circuits of block 201-38 include several OR and AND gates. These circuits are used to force the TBL line to a binary ONE. The TBL line is forced on when bit position 16 of the PCR register 204-22 has been set as a result of a "time out" prior to the SIU switching of the processor 200 into level zero. That is, signals corresponding to bit position 16 and the level bit positions 24-26 are "ANDed" such that the TBL line is switched on when bit position 16 is a binary ONE and the PCR bits indicate that the processor is not level zero. Another group of circuits provide a logical OR of the exception bit signals stored in PCR register 204-22 (i.e., bit positions 0-8). The output is then "ANDed" with the level bits 24-26 of the PCR register 204-22. Thus, when the processor has been switched to level 0, any one of the exception signals forces the TBL line to a binary ONE. However, prior to the processor 200 being switched to level zero, exception signals are inhibited from switching the TBL line to a binary ONE. The reason for this is that during an initial self test operation, the time that an error occurs there could already be an exception signal stored in the PCR register 204-22 and it is desirable that this not be detected as a trouble indication. That is, a specific test (self test) is used to establish trouble indications, as explained herein.

FIG. 2a

This Figure shows in greater detail the steering switch portions of processor 200. As discussed previously, steering switch 204-10 provides steering information to SIU 100 for either a R/W command or a PI command under the control of the address switch control bits in the register 201-15.

The circuits of FIG. 2a generate the appropriate steering for a memory command as follows.

Bit 0 is forced to a binary ZERO for a memory command. Bit 1 is coded to define local or remote memory and is set equal to bit 0 of the page table word (PTW) when the address is paged or to bit 0 of bus WRP when the address is absolute. Bits 2-4 are memory steering bits and their initial value equals PTW bits 1-3 when addressing is paged or equals the WRP bits 1-3 when addressing is absolute. These values also represent a final value when bit 1 is coded to define access to remote memory.

When bit 1 defines local memory, bits 2 and 3 are coded to specify the local memory port and steer selectively addresses to the ROM in the local memory unit. Bit 2 is equal to the Exclusive OR of the initial value (i.e., PTW or WRP bits) and the state of the LMPS line from SIU 100. Bit 3 equals the Exclusive OR of the PCR ROM bit and the initial value. Bit 5 defines a single or double word memory cycle and equals bit 1 of the ZAC field of CSR register microinstruction. Bit 6 defines a read or write cycle and equals bit 0 of the ZAC field.

The circuits which generate the steering include a 1 of 2 data selector circuit 204-60 which forms part of switch 204-6. The selected steering signals STSWI1110 through STSWI3110 are applied as inputs to different ones of AND/NAND gates 204-62 through 204-66 as shown in FIG. 2a. Additionally, a steering bit signal LMPS100 from SIU100 is applied as an input to an AND/NAND gate 204-68 and a ROM bit signal corresponding to bit 19 of PCR register 204-22 is applied as an input to an AND/NAND gate 204-70.

A first plurality of AND gates 204-72 through 204-76 and an OR gate 204-78 generate signals corresponding to an Exclusive OR of the initial value (PTW01100 or WRP01100) of bit 2 and signal LMPS100 when signal STSWI1110 defines local memory (i.e., equals a binary ZERO). The Exclusive OR is obtained by combining the assertion and negations of the two signals. When signal STSWI1110 is a binary ONE indicating access to remote memory, AND gates 204-72 and 204-74 are inhibited. As mentioned, the steering bit signals correspond to either the PTW bits or WRP bits defined by signals STSWI1110 through STSWI3110. These signals are applied either directly or via AND gates 204-76 and 204-86.

In accordance with the present invention, a plurality of AND gates 204-82 through 204-86 and an OR gate 204-88 generate an Exclusive OR of ROM bit 19 from PCR register 204-22 corresponding to signals PCR19ROM010 and the initial value of bit 3 (i.e., PTW02100 or WRP02100) when signal STSWI1110 defines local memory. When signal STSWI1110 is a binary ONE, indicating access to remote memory, AND gates 204-82 and 203-84 are inhibited. The steering bit signals correspond to either the PTW bits or WRP bits defined by signals STSWI1110 through STSWI3110.

Figure 2A:
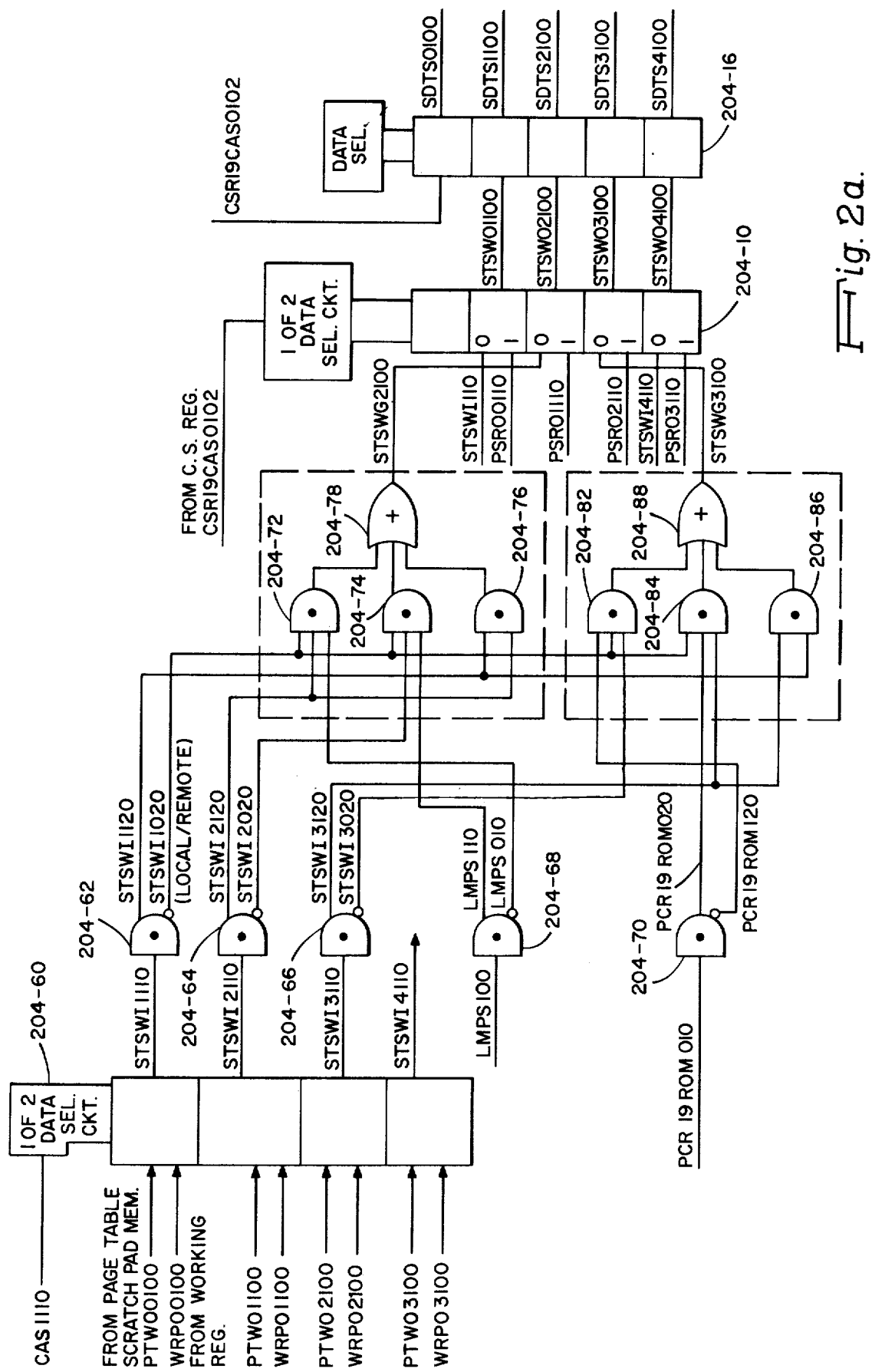
FIG. 2a shows in greater detail a portion within the processing unit of FIG. 2 in accordance with the present invention.

As seen from FIG. 2a, the output signals STSWG2100 and STSWG3100 from the circuits 204-78 and 204-88 together with signals STSWI1110 and STSWI4110 are applied as one set of inputs to data selector circuit 204-10. The other set of inputs are from PSR register 204-20 of FIG. 2. The output signals STSW01100 through STSW04100 from circuit 204-10 selected in response to a control signal CSR19CAS0102 from CSR register 201-15 are loaded into steering register 204-16. It will be noted that bit position 0 of register 204-16 is set to a binary ONE by control signal CSR19CAS0102. The steering signals SDTS0100 through SDTS4100 are applied to the SDTS lines of SIU100.

DETAILED DESCRIPTION OF SYSTEM INTERFACE UNIT 100

Interrupt Section 101

Figure 3A:
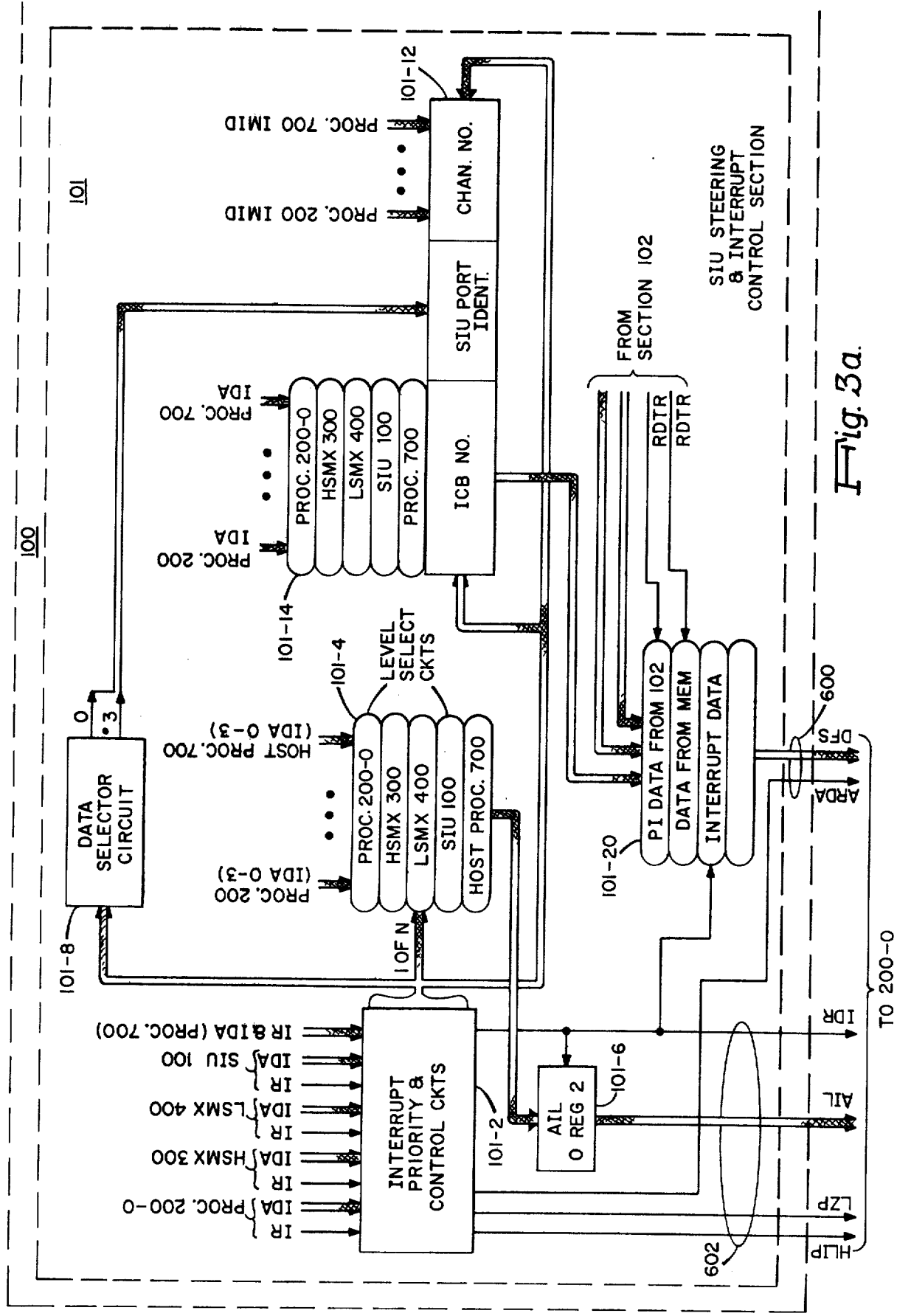
FIG. 3a through 3d show in greater detail the system interface unit and local memory of FIG. 1.

The system Interface Unit 100, as mentioned, provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G, and J, each of which applies signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor pair 200-0 referred to herein as processor 200 when there is a request having a priority higher than that of the process being executed. When processor 200 signals that it is able to accept the request, the SIU 100 gates the identifier information associated with the highest priority request to processor. The identifier information includes an eight bit interrupt control block number including a parity bit, a three bit interrupt level number and a one bit processor number with a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuit of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K.

This means that in the system of FIG. 1 the port of the current process has the highest followed by the SIU 100, the high speed multiplexer 300, the host processor 700, the processor 200, and the low speed multiplexer 400.

The priority circuits of block 101-2 are operative to generate an output signal on one of n number of output lines, n corresponds to the number of interrupting modules within the system. The n output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LMO |
| 0001 | port K |
| 0010 | SIU 100 - port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

Data Transfer Section 102

Figure 3B:
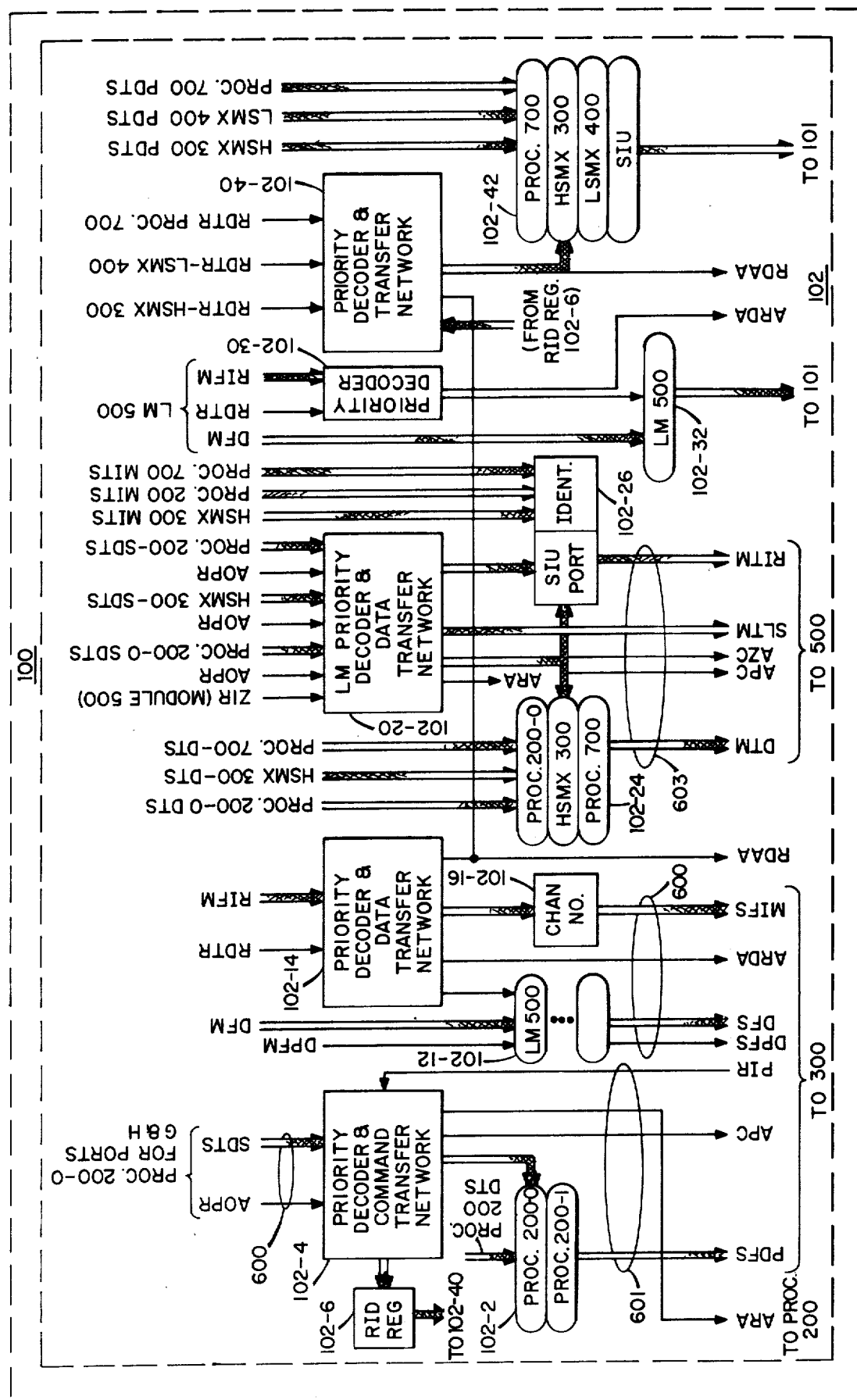

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desires to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted by memory module 500.

An arrangement similar to network 102-14 is used by SIU 100 to transfer PI and memory commands from any one of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700, and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of the FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During a next cycle of operation, the network 102-40 forces the RDAA line to a binary ONE signaling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

Local Memory

Figure 3C:
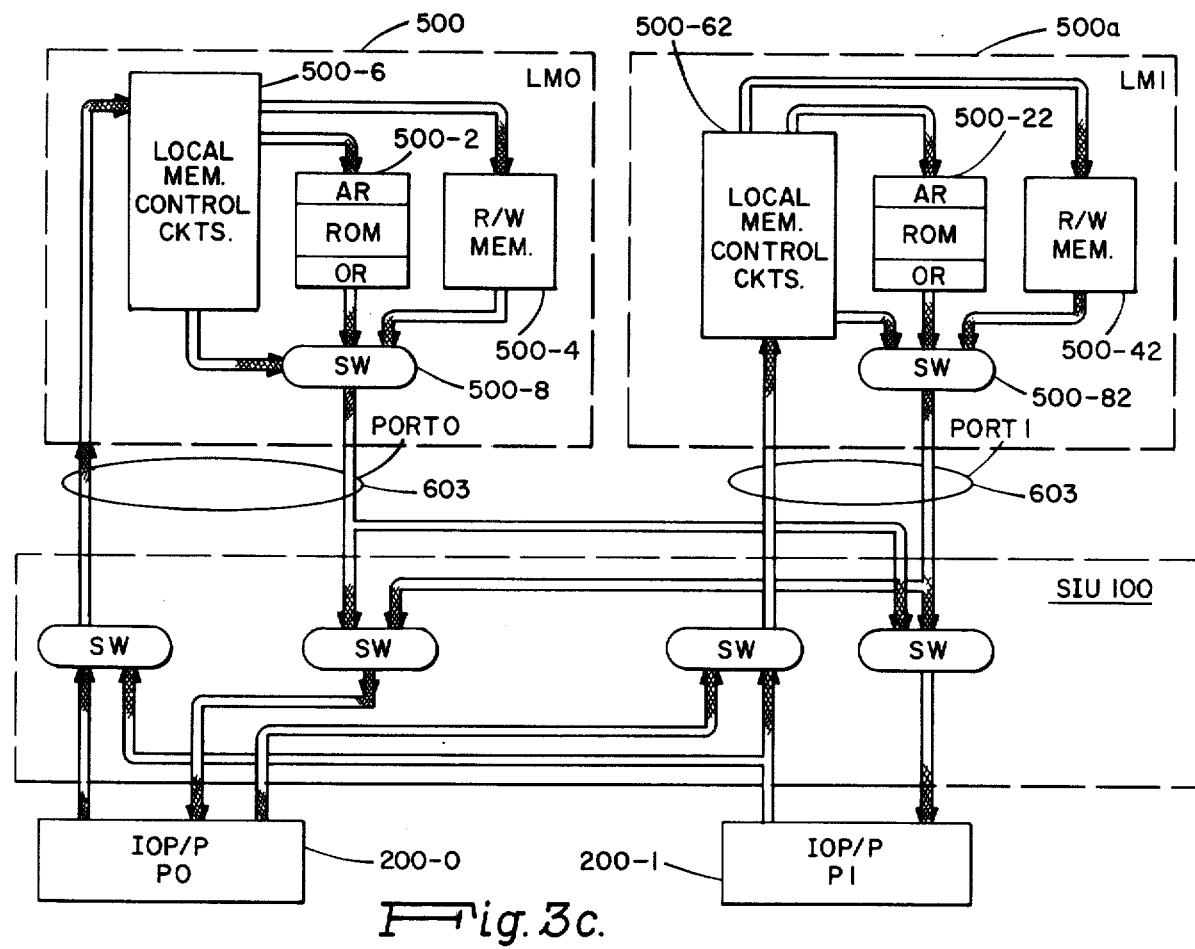

As seen from FIG. 3c, each local memory unit (i.e., 500 and 500a) includes a read only memory (ROM) (500-2 and 500-2a) used for storing various control routines such as "boatload routines" for the input/output system of FIG. 1. Each unit also includes a read/write memory (i.e., 500-4 and 500-4a) which stores the prime and operation routines for operating the input/output processors of FIG. 1.

Each unit couples to a local memory interface 603 of FIG. 5d. The interface 603 can be viewed as including two functional portions or ports, a zone, address and command (ZAC) port and a programmable interface (PI) port. The ZAC port is used to read and write information from and into memory in response to ZAC commands. The PI port is used to read and load registers and flip-flops within a control section 500-6 and 500-6a in response to PI commands.

As seen from FIG. 5d, the two functional ports share the same set of lines except for the request and ready lines (i.e., PIR and ZIR lines). Each control section operates to decode the various commands and generate the required signals for command execution such as transferring the contents of one of the locations of either ROM 500-2/500-2a or memory 500-4/500-4a via an output data selector circuit 500-8/500-8a to SIU100. The various transfer paths to and from each of the processor pairs P0 and P1 are shown diagrammatically in FIG. 3c.

The formats of the ZAC commands and PI commands are shown in FIGS 7a through 7c. The format of the load and store instructions which cause a processor pair to generate ZAC commands is illustrated in FIG. 7c. The format of the RDEX and WREX instructions which cause a processor pair to generate PI commands is illustrated in FIG. 6.

Figure 3D:
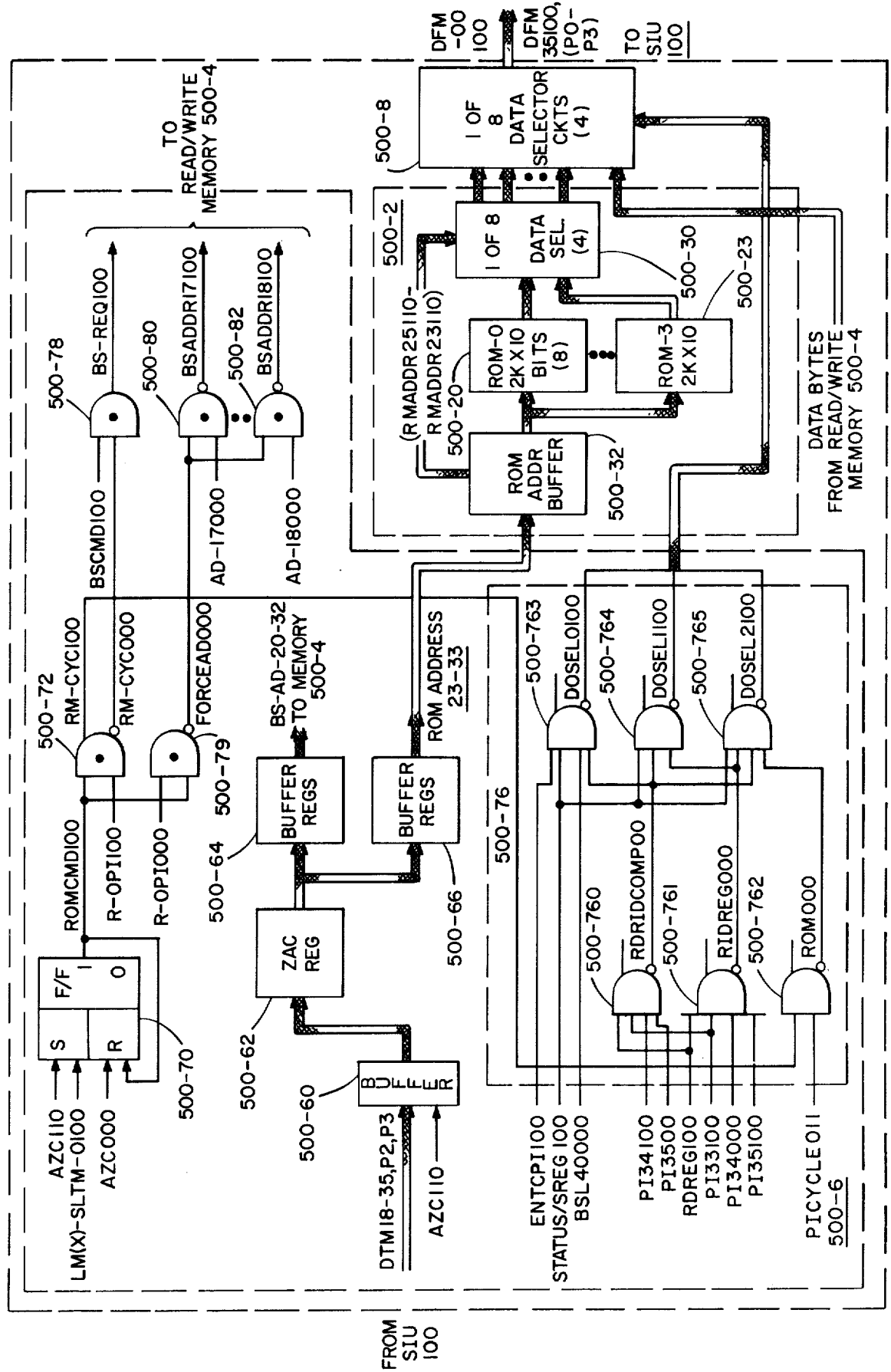

FIG. 3d shows in greater detail, the circuits of local memory control section 500-6 and ROM 500-2. Referring to the Figure, it is seen that the section 500-6 includes a number of buffer registers 500-60, 500-62, 500-64 and 500-66 which are arranged to store the 4 bytes of a ZAC command applied via the DTM lines. A flip-flop 500-70 receives signal SLTM0100 which corresponds to bit 0 of the SLTM lines from SIU 100. As explained herein with reference to FIG. 3b, the state of this signal is determined by the state of bit 2 of the steering data applied to the SDTS lines by one of the processor pairs P0 or P1. When signal SLTM0100 is set to a binary ONE in response to a ZAC command, this causes selection of ROM 500-2. That is, when the ZAC command is applied to local memory 500, signal AZC110 is a binary ONE. This switches flip-flop 500-70 to a binary ONE forcing a ROM command signal ROMCMD100 to a binary ONE. Assuming that the ROM 500-2 is operational (i.e., signal ROPI100 is a binary ONE and signal ROPI000 is a binary ZERO), and AND/NAND gate 500-72 forces a ROM cycle signal RMCYC100 to a binary ONE.

The signal RMCYC100 is applied as one input to an encoder network 500-76. As seen from FIG. 3d, the network 500-76 includes a plurality of NAND/AND gates 500-760 through 500-765 arranged as shown. The first set of gates combine signals from ZAC and PI command registers and generate signals indicating the presence of different commands (i.e., compare requester ID-RDRIDCOMP00, read ID register-RIDREG00 and ROM cycle-ROM000). These signals are combined with other command signals (i.e., PI command-ENTCPI00, status-STATUS/SREG100, backing store 500-4 load-BSL40000 and PI cycle-PICYCLE011) to produce an encoded set of three signals DOSEL0100, DOSEL1100 and DOSEL21000 which are applied to output data selector circuits 500-8. The states of the three signals determine the source of the output data to be applied to the DFM lines.

Additionally, the complement of signal RMCYC100 is applied to an AND gate 500-78. The signal RMCYC000 in the presence of a ROM cycle inhibits the generation of a request to memory 500-4 (i.e., prevents signal BSREQ100 from being forced to a binary ONE by signal BSCMD100). The NAND gates 500-79 through 500-82 enable address signals to be applied to memory 500-4 in the absence of a ROM command or when the ROM is not operational (i.e., when either signals ROMCMD100 or ROPI000 is a binary ZERO).

As seen from FIG. 3d, the ROM 500-2 comprises 4 substrates 500-20 though 500-23, each substrate containing 8 programmable ROMS each having 256 words by 10 bits. The output lines from each substrate connect to a different one of four 1 of 8 data selector circuits 500-30, which in turn connect to a one input of a different one of four selector circuits 500-8. Each of the substrates receive address signals from a ROM address buffer 500-32. The buffer 500-32 also applies a group of these address signals to each of the four data selector circuits 500-30 for selecting the output signals from one of the 8 programmable ROMS of each of the four substrates.

DETAILED DESCRIPTION OF HIGH SPEED MULTIPLEXER 300

COMMON SECTION

Figure 4B:
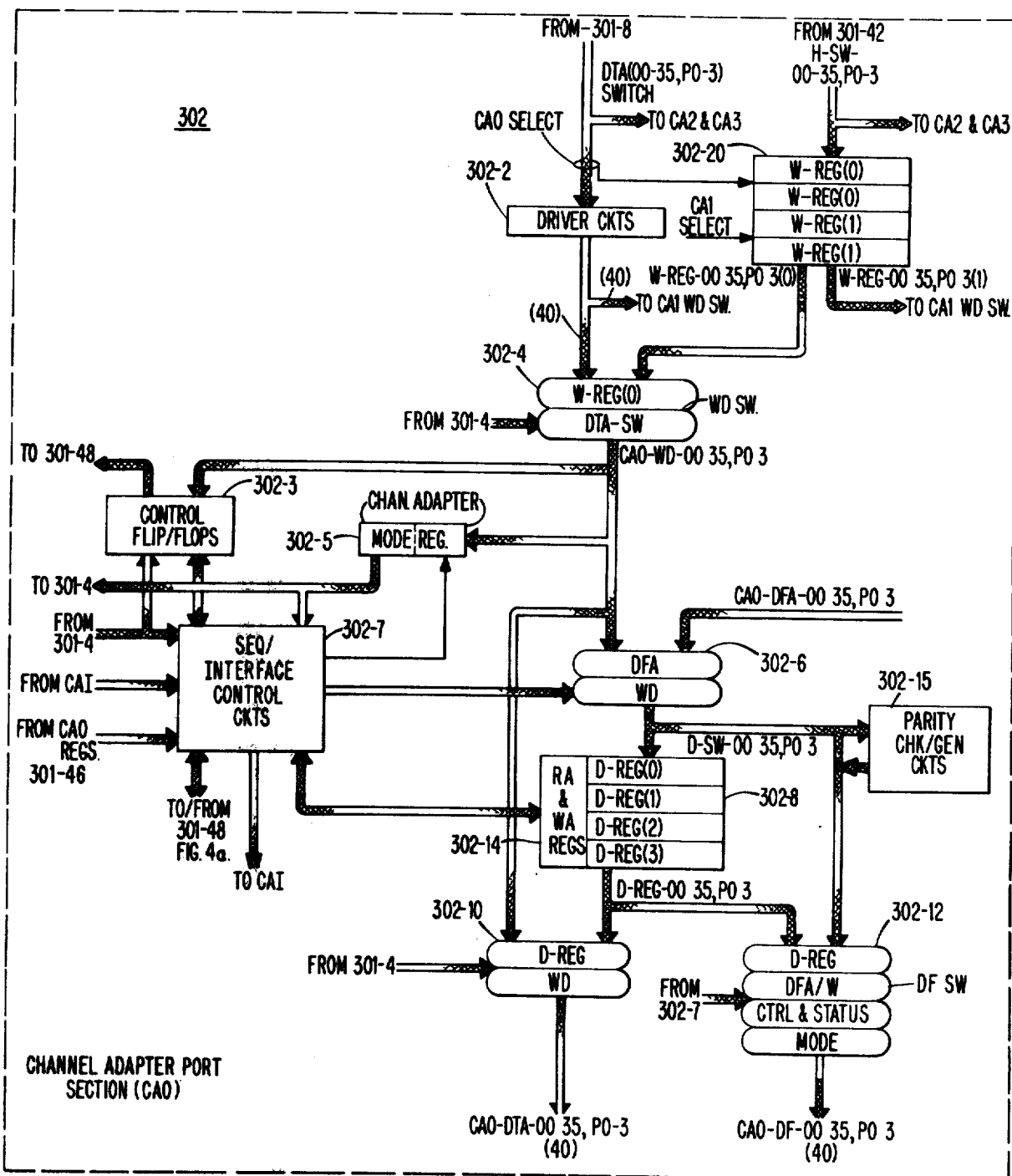
Figure 9:
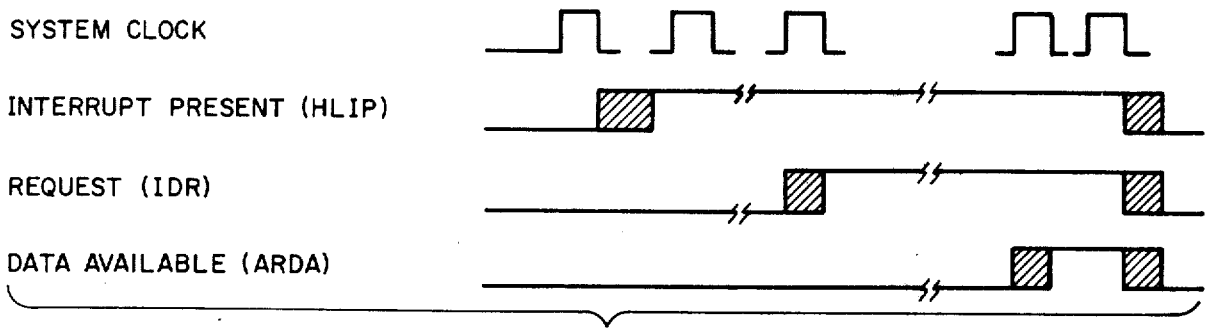
FIG. 9 illustrates the signal sequence for processing an interrupt.
Figure 10A:
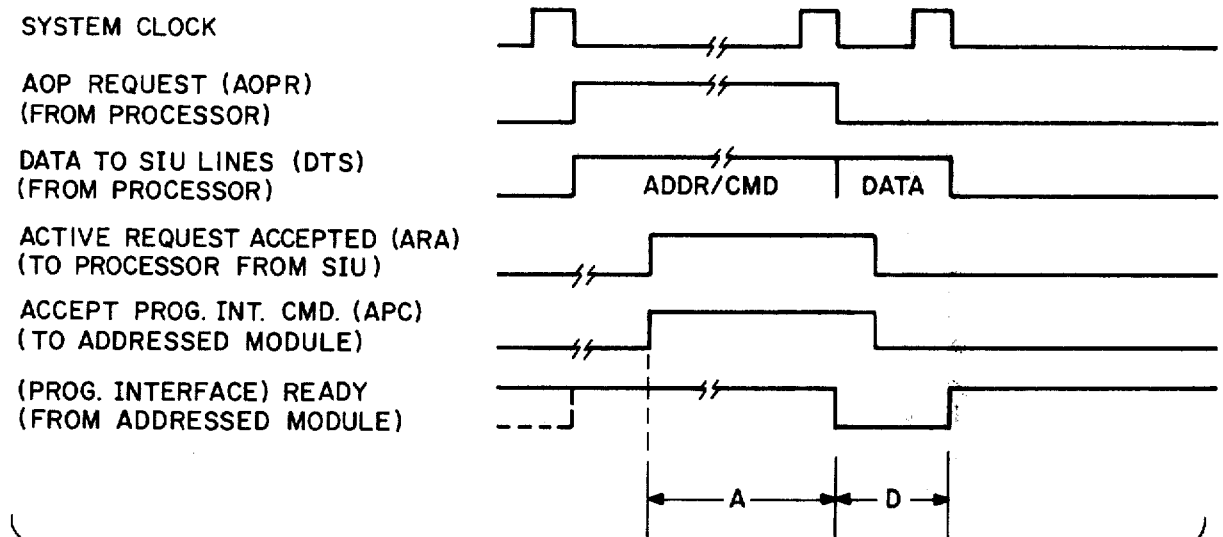
FIG. 10a and 10b illustrate the signal sequences for transferring a WREX command.
Figure 10B:
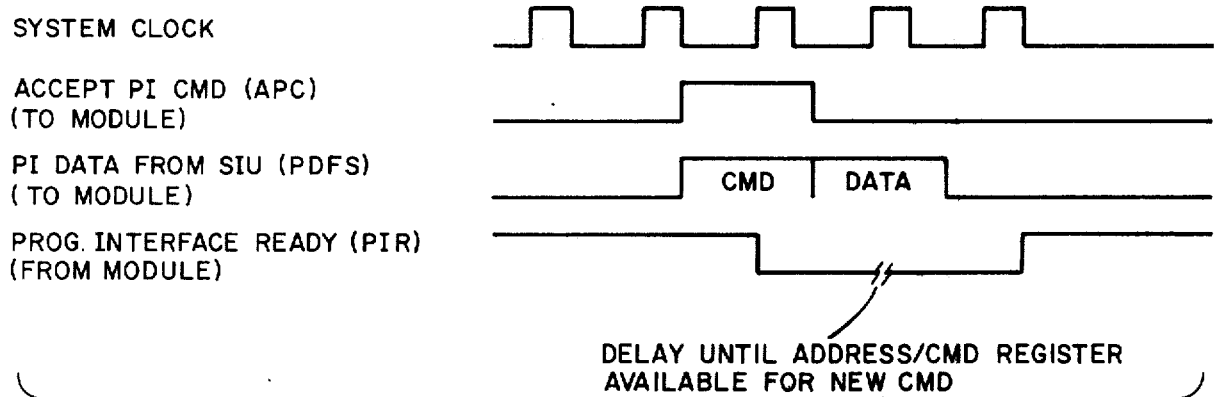
Figure 10C:
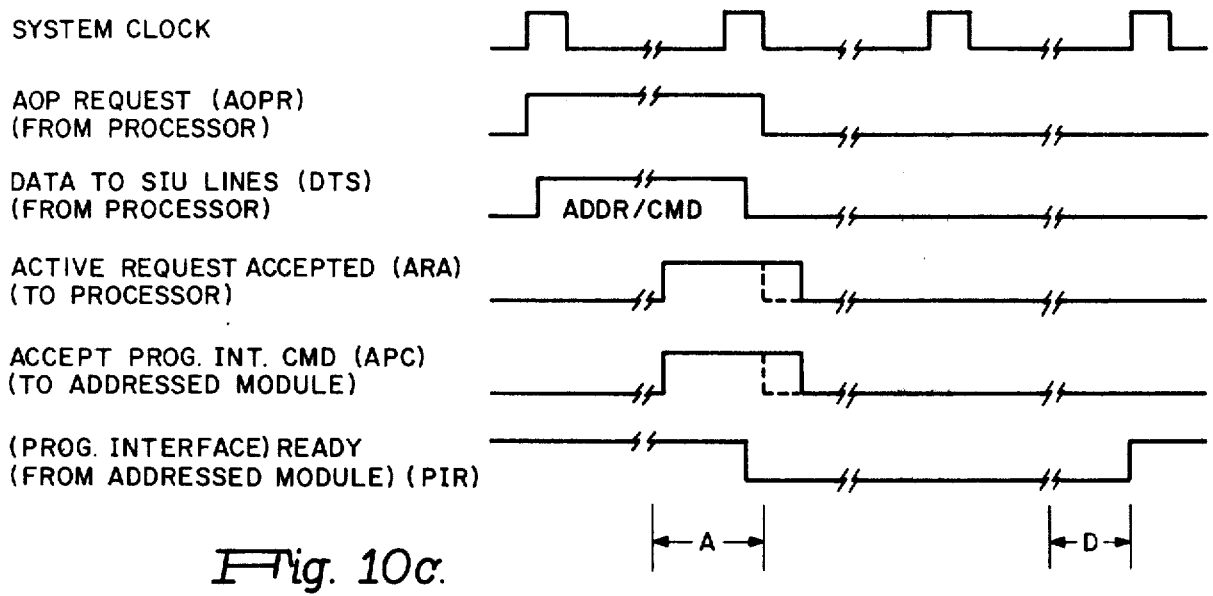
FIGS. 10c and 10d illustrate the signal sequences for transferring a RDEX command.
Figure 10D:
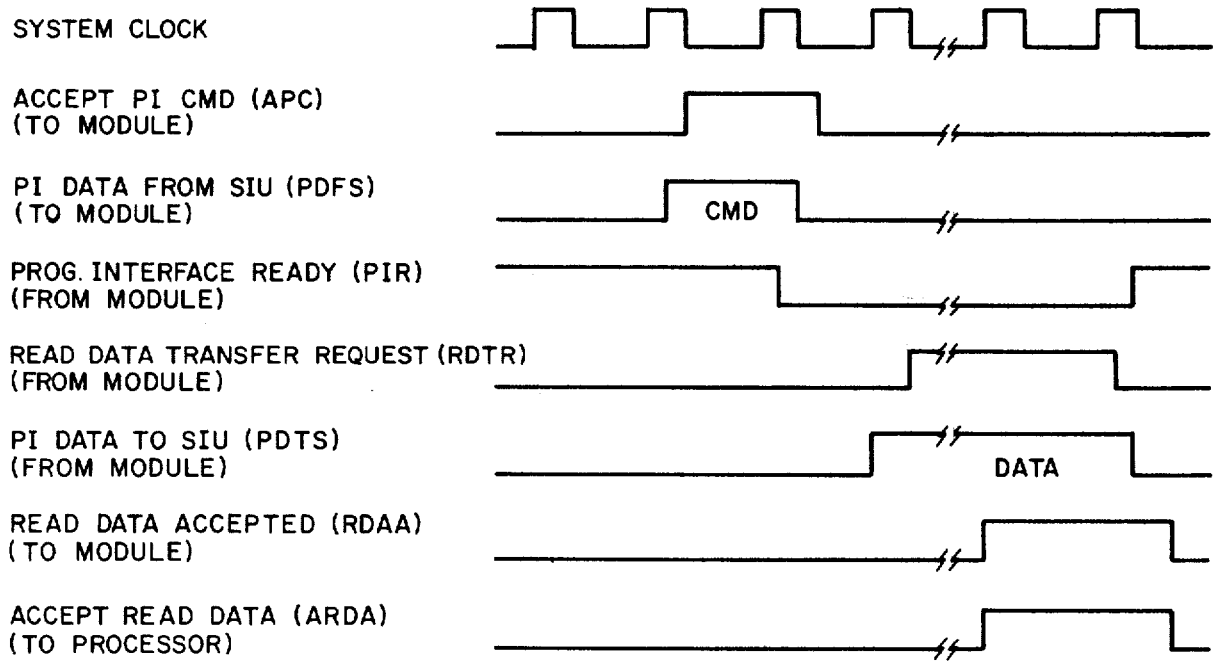
Figure 11A:
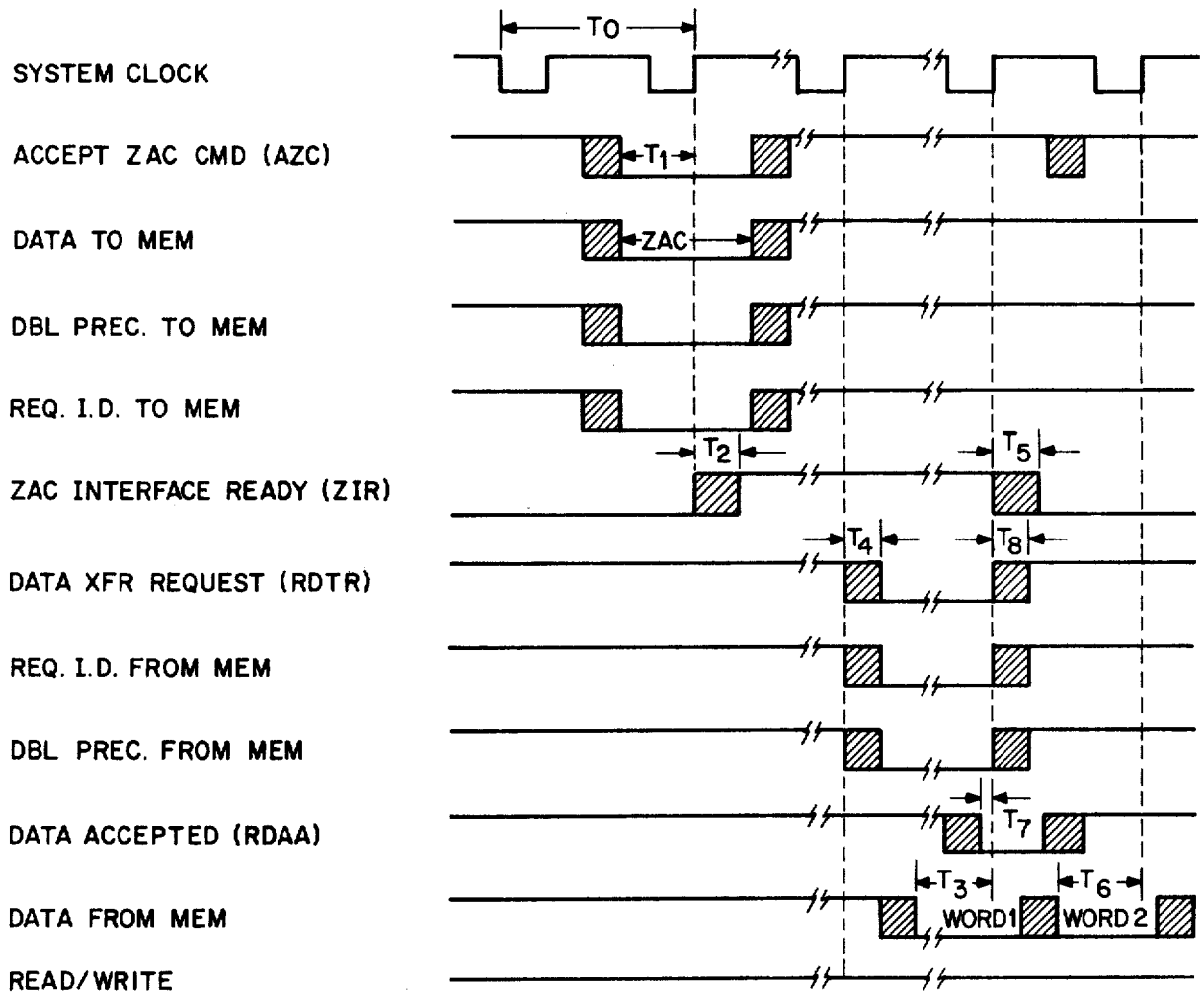
FIGS. 11a and 11b illustrate in terms of negative logic (i.e., binary ONE = negative transition) the signal sequences for performing memory read and memory write operations respectively.
Figure 11B:
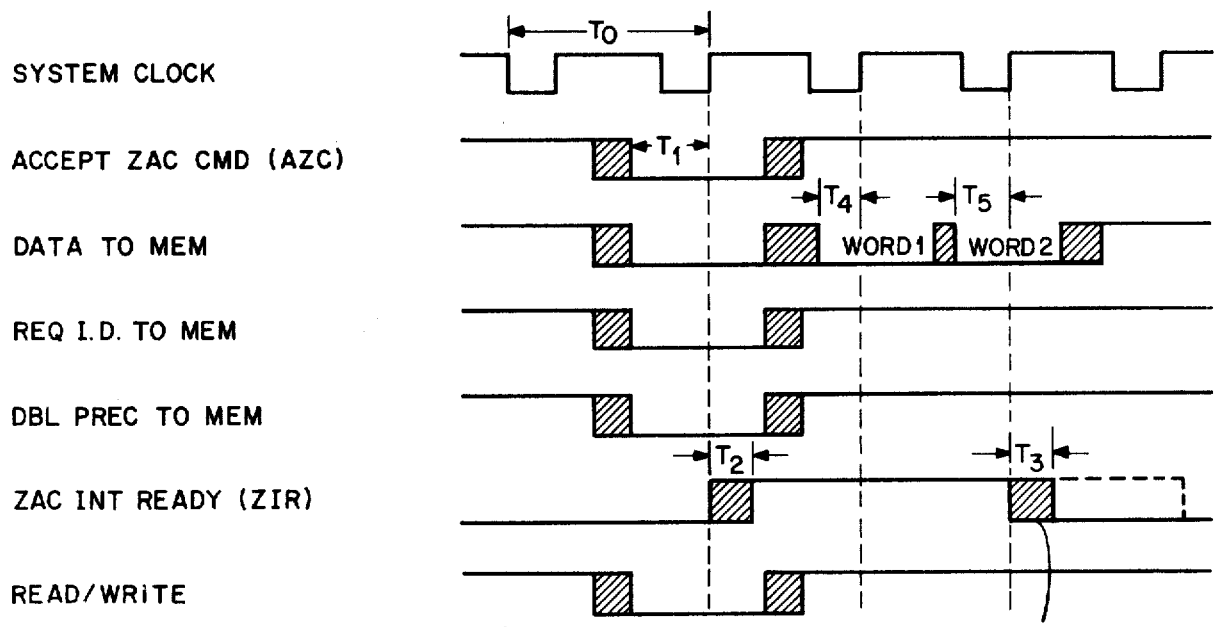

FIGS. 4a and 4b disclose in greater detail the common control section 301 and a portion of the channel adapter section 302. Referring first to FIG. 4a, it is seen that the common control section includes a pair of registers 301-2 and 301-5 for storing the words of a PI command received via the PDFS lines of the multiplexer programmable interface 601 through a two position data selector switch 301-1. The switch 301-1 enables PI command signals from an alternate path (i.e., DFS lines) to be loaded into registers 301-2 and 301-5. However, only the PDFS position will be used. It is also seen that a register 301-40 receives via driver circuits 301-3 memory data applied to the DFS lines of the multiplexer data in interface 600.

The command signals from both registers 301-2 and 301-5 are selectively applied via a two position data selection switch 301-6 of the four channel adapter sections via driver circuits of block 301-8. Also, the command signals can be selectively applied to one position of an eight position data selector switch 301-20 via a two position data selector switch 301-42. The same switch 301-42 also applies the data signals from register 301-40 to each of the four channel adapter sections via driver circuits of block 301-43.

A pair of parity check circuits 301-45 and 301-49 perform a check upon the contents of registers 301-2, 301-5 and 301-40 and apply signals representative of the results to the circuits of block 301-4 which provides status signals applied to C switch 301-50. These circuits comprise logic circuits, conventional in design, which combine signals from register 301-2 with signals from the channel adapter sections to generate control signals necessary for executing the commands received from processor 200.

Additionally, the signals from register 301-5 can also be loaded into a selected one of the plurality of registers of blocks 301-10, 301-12 and 301-14 via driver circuits of blocks 301-8, 301-15 and 301-16. The block 301-10 comprises 4 8 bit registers, conventional in design, which may take the form of registers disclosed in the aforementioned Texas Instrument publication (e.g. TI 7481). Output signals from each of these registers can be selectively applied as an input to an interrupt position of selector switch 301-20 together with the corresponding signals from a four position selection switch 301-30 and an eight position selector switch 301-32. The contents of the ICB, level and mask registers of the channel adapter sections can be read during the performance of testing and verification operations in response to PI commands.

Additionally, the interrupt control block registers of block 301-10 are selectively connected to a 14 bit interrupt data (IDA) register 301-22 in response to signals generated by an interrupt level priority network 301-24. Groups of bit positions of each of the 24 bit level registers of block 301-12 are applied to corresponding positions of a different one of the 8 position multiplexer selection switches 301-26 through 301-28. It is also seen that each of the level registers of block 301-12 connect to different positions of the four position selector switch 301-30 and eight position selector switch 301-32. It is also seen that each of the 8 bit mask registers of block 301-14 connect to different positions of the four eight selector switch 301-32 and to the interrupt enable priority and type logic circuits of block 301-34.

As seen from FIG. 4a, the circuits of block 301-4 receive groups of interrupt request signals from channel adapters in addition to groups of interrupt signals generated by the controller adapters attached to the channel adapters. More specifically, each CA channel can genrate four different types of interrupt requests. They include a fault interrupt caused by setting of a parity error indicator bit within a common status register, not shown, which can be considered as part of block 301-4, a data control word (DCW) interrupt, a programmable interrupt, and an exception interrupt produced by the detection of an illegal command etc. The fault interrupt is made common to each channel so as to have one input to block 301-34 which is the same for all four channels.

Each controller adapter can also generate four different types of interrupt requests which are dependent upon the type of device connected to the adapter. In the case of a disk device, the types of interrupt requests include: a fault interrupt caused by detection of parity errors, a rotational position sensed interrupt, a data transfer termination interrupt and an off-line interrupt caused by completion of an off-line operation such as a seek operation. The four types of channel interrupt requests and the four types of CA interrupt requests together provide a group of eight types per CA channel designated as events EV0 through EV7. Each type of interrupt request is assigned a three bit type number such that the four channel types of interrupt requests are numbered 0-3 corresponding to EV0-EV3 while the four controller adapter types of interrupt requests are numbered 4-7 corresponding to EV4-EV7. The events having the lowest codes have the highest priority (e.g. 000 = highest priority = EV0 = fault interrupt and 111 = priority type = EV7 = off-line interrupt). The priority for the different types of interrupt requests is fixed and is determined by the type number. For further information regarding the assignment of priority types, reference may be made to the copending application titled "Programmable Interface Apparatus" which is assigned to the assignee of the present invention. Each of the channels provide 7 interrupt requests inputs to block 301-34 together with the common fault input provided by block 301-4.

The circuits within block 301-34 logically combine the signals from each of the mask registers of block 301-14 with the interrupt request signals from each channel and adapter and select the interrupt type having the highest priority for each channel. The three bit type code for each channel is applied to a corresponding one of the multiplexer selector circuits 301-25 through 301-28. The sets of type codes generated by block 301-34 are also applied as inputs to corresponding ones of the positions of a four position level/type selector switch 301-35.

Each of the multiplexer circuits 301-25 through 301-28 upon being enabled by the circuits of block 301-34 provide an appropriate three bit level code as an input to an interrupt level priority network 301-24. The network 301-24 generates signals on a pair of lines which connect as control inputs to the ICB registers of block 301-10, the switch 301-35 and a four position interrupt multiport identifier IMID switch 301-36. The signals generated by network 301-24 designate the channel or port having the highest priority. In the case where more than one channel has the same priority level, the circuits of network 301-24 select the channel assigned the lowest channel number (i.e. CA0=00X-X=highest priority, CA3=11XX=lowest priority). In those instances where the controller adapters employ subchannels or subports, a pair of lines from the CAI provide signals to the low order two bit positions, of switch 301-36. The high order 2 bit positions of the switch are permanently with the corresponding channel adapter number (e.g. 00=CA0 etc.). The output of switch 301-36 is applied to IMID register 301-23 ad depicted in FIG. 4a.

The output signals from the selected ICB register of block 301-10, the level signals from the selected multiplexer circuits and the type signals from block 301-34 are merged into the IDA register 301-22. Also, these signals are applied to the parity generator circuits of a block 301-37 which generates a pair of odd parity bits for the signals stored in the register 301-22. A further flip-flop 301-21 which can be considered part of register 301-22 receives a signal from the circuits of block 301-34 to indicate the presence of an interrupt request.

As seen from FIG. 4a, data signals stored in bit register 301-40 are applied via the H register position of two position data selector switch 301-42 to a two position channel write (CW) switch 301-44. The first position of the switch 301-44 when selected loads one of the four groups of channel adapter port registers 301-46 selected in response to signals generated by priority select and control circuits of block 301-48. The circuits of block 301-48 which receive input signals from registers 301-2 and 301-68 and the channel adapters shown apply output signals to the lines and output registers 301-65. The registers of group 301-46 include a 40 bit register for storing a list pointer word (LPW) for the port associated therewith, a 40 bit DA register for storing the address of data to be read or stored and a 40 bit register DT for storing tally and control information relating to a current data transfer operation. The same registers of the four channel adapter sections connect to different positions of a four position data selector switch 301-50 which receive control signals from the circuits of block 301-48. The output signals from switch 301-50 are applied to a pair of adder networks 301-52 and 301-54 in addition to a parity check circuit 301-56 operative to check the contents for errors. The adder network 301-52 is operative to update the contents of the register selected via switch 301-50 while the adder network 301-54 applies output signals to a parity generator circuit 301-58. The signals from the circuits 301-52 and 301-58 are returned to the selected register via the update network position of switch 301-44.

As also seen from FIG. 4a, the output signals of switch 301-50 are applied selectively to an 8 bit steering register 301-60 via a steering switch 301-59 and to the DT switch 301-20. Each of the data selector switches 301-59 and 301-61 receives output signals from DT switch 301-20 which in addition to the sources mentioned is connected to receive data signals from the DF lines of each of the channel adapter sections CA0-CA3. The output signals from DT switch 301-20 and ZAC switch 301-61 are applied to a parity generator and check circuit 301-62 and to the bank of registers of block 301-64. Additionally, switch 301-61 is connected to receive zone and command information derived from channel adapter service lines applied to block 301-4 when the multiplexer 300 is being operated in a particular mode not pertinent to the present invention. The four registers of block 301-64 designated as ZAC, PDTS, Data 1, and Data 2 respectively store memory command signals, PI data signals and channel adapter data signals. The output signals from these registers are applied either to the lines DTS of the multiplexers data interface 600 or the PDTS lines of the multiplexers interface 601. When the ZAC register of block 301-64 is loaded, this causes an AOPR flip-flop 301-65 to be switched to a binary ONE which signals the SIU 100 that the multiplexer 300 is requesting a path over which it can transfer a memory (ZAC) command and data. The appropriate memory steering information applied via switch 301-59 will have been stored in register 301-60 and a parity check and generator circuit 301-66 is operative to generate odd parity for the steering information.

CHANNEL ADAPTER SECTIONS

FIG. 4b shows the registers and data selector switch which comprise each of the channel adapter sections CA0-CA3. Since each of the sections are identical, only section CA0 is shown. It is seen that the section receives output signals from data transfer switch 301-6 and H switch 301-42. The signals from DT switch 301-6 are applied via driver circuits of block 302-2 to a two position data selector (WD) switch 302-4. The output command signals from switch 302-4 can be loaded selectively into either a mode register 302-5 or into a plurality of control flip-flops 302-3 in response to control signals from 301-4.

Output signals from the mode register 302-5 and the control flip-flops are applied as inputs to the logic circuits of block 302-7 which generate the required control signals for execution of a command by the controller adapter connected to the section. Also, the circuits of block 302-7 receive control signals from block 301-4 from the register group 301-46 associated with the channel adapter and from the lines of the controller adapter interface.

In the present embodiment, the controller adapter interface includes the following lines.

| CONTROLLER ADAPTER LINES | |
|---|---|
| Designation | Description |
| DTA | The data to adapter lines are 40 lines which extend from the module 300 to the controller adapter used to transmit data including commands and addresses to the adapter. |
| ADTA | The accept data to adapter line extends from the module 300 to the adapter and when set indicates that data is available on the DTA lines and that it should be accepted by the adapter. |
| ACTA | The accept control to adapter line extends from the module 300 to the adapter and when set indicates that a PI command or data is available on the DTA lines and that it should be accepted by the adapter. |
| CHBSY | The channel busy line extends from the module 300 to the adapter and when in an indirect mode indicates to the adapter that the multiplexer 300 is now in an Auto data transfer mode; the channel remains busy until the termination of the Auto data transfer operation. In a direct mode, this line is set when a memory (ZAC) command is received from the adapter and remains set until either the requested read data is transferred or status is returned from the memory module. |
| CDR | The channel data ready line extends from the module 300 to the adapter and when set indicates that the module 300 is ready to accept more data or commands from the adapter. |
| EDT | The end data transfer line extends from the module 300 to the adapter and is used during Auto data transfer operations in indirect mode to indicate that the last word of data has been transferred (Write) or that the last word of |

-continued

| CONTROLLER ADAPTER LINES | |
|---|---|
| Designation | Description |
| | data has been stored (Read). |
| DFA | The data from adapter lines are 40 lines which extend from the controller adapter to module 300 used to transfer data including status memory addresses, commands, to module 300. |
| PIDFA | The port identifier from adapter lines are two lines from the adapter to module 300 used in conjunction with the interrupt lines to indicate which subport on the controller adapter caused the interrupt. |
| ADFA | The accept data from adapter line extends from the adapter to module 300 and when set indicates that data or memory command is applied to the DFA lines and should be accepted by module 300. |
| AD-BUSY | The adapter PI busy line extends from the adapter to module 300 and when set indicates that the adapter has accepted a PI command and is not capable of accepting any more commands. |
| ADR | The adapter data ready line extends from the adapter to the module 300 and when set indicates to the channel that the adapter is ready to accept more data. |
| IFA | The interrupt from adapter lines are four lines which extend from the controller adapter to module 300 and indicate the type of interrupt requests (i.e. generates EV4-EV7 signals applied to block 301-34). |
| TFA | The terminate from adapter line extends from adapter to module 300 and when set indicates the termination of a data transfer operation to module 300. |

It will be appreciated that the controller adapter interface includes other lines required for performing other functioning such as initializing, enabling, etc.

Output signals from switch 302-4 are applied to a further two position selector switch 302-6 which also receives data signals applied to the lines DFA by the controller adapter associated therewith. During a data transfer operation, the output signals from the DFA position of switch 302-6 are loaded into different ones of the four 40 bit data registers 302-8 for transfer to common section 301 via a four position switch 302-12 or to the controller adapter via a two position selector switch 302-10. Additionally, output signals from WD switch 302-4 are transferred to the controller adapter via the WD position of switch 302-10. Different ones of the registers 302-8 are selected for loading and unloading by the address signals stored in read and write address registers of block 302-14 which are modified by signals generated by the circuits of block 302-7. Also, these WA and RA registers supply signals indicative of the number of words stored which are used to determine the status of a transfer operation.

During a data transfer operation, the parity check and generation of circuits block 302-14 are operative to check the parity of the data signals received from the controller adapter via switch 302-6 and generate appropriate parity as required. It is also seen that switch 302-4 receives signals from the first pair of channel write data registers (W Reg 0, W Reg 1) which store two words of information for transfer from H switch 301-42 to either the registers 302-8 or directly to the controller adapter via the selector switch 302-10.

DESCRIPTION OF OPERATION

With reference to FIGS. 1 through 14, the operation of the preferred embodiment of the present invention will now be described. In the preferred embodiment, each local memory ROM stores high priority (level 0) interrupt processing routines, initialize and bootload routines. Additionally, each ROM stores routines necessary for restarting the input/output processing system of FIG. 1 after initialization by test and diagnostic routines.

The operation will be described with reference to the flow chart of FIG. 14 which illustrates the manner in which instructions can be fetched from both ROM and read/write memory. As seen from FIG. 14, it is assumed that processor pair P0 is executing instructions being read out from read/write memory 500-4.

The instruction buffer registers 202-2 hold up to 4 instructions to be executed. These instructions are fetched from memory during the execution of previous instructions. For further information regarding the fetching of instructions, reference may be made to the application "Instruction Look Ahead Having Prefetch Concurrency and Pipeline Features" invented by Marion G. Porter, et al, serial no. 562,272.

The next instruction in registers 202-2 is begun during the execution of a current instruction when bits 0-17 are applied to instruction register switch 202-4. The index bits 14-17 of the next instruction are then used to address a specified one of the general register locations of scratch pad memory 203-10 via position 3 of switch 203-14 (i.e., LEV, XR1). This operation is performed by a last microinstruction included in a microinstruction sequence associated with the current instruction. The contents of the location are read out to buffer 203-16. When a second level of index is required, bit 18 of the address syllable is set to a binary ONE. The same microinstruction also performs a skip test for establishing whether the second level of indexing is required. It will be assumed that a typical memory reference instruction is the next instruction to be executed. All such instructions have the format shown in FIG. 8a.

The contents of the index register specified by bits 14-17 of the instruction are applied via position 0 of switch 203-20 to the A operand input of adder 204-2 while the displacement field D of the instruction is applied via position 0 of switch 204-1 to the B operand input of adder 204-2. The two are added together and the result is transferred to working register R2 via switch 204-8.

During a next cycle, index bits 19-22 of the instruction are applied via position 4 (i.e., LEV, XR2) of switch 203-14 for addressing a specified one of the scratch pad memory locations. During the same cycle, a call operation is performed in which a branch address from register 201-15 is applied via the constant position of switch 201-14 to control store 201-10 and the contents of the next address register 201-24 are loaded into the return address register 201-20. The branch address when applied to control store 201-10 is incremented by one and loaded into next address register 201-24 via adder 201-22. Since bit 18 is a binary ONE, the above causes the control store 201-10 to branch to a second level indexing routine SECX.

During the next cycle of operation, the contents of the second index register are applied via position 0 to the A operand input of adder 204-2. The previous stored result in register R2 is applied via position 3 of switch 204-1 to the B operand input of adder 204-2. The index register and R2 register values are added together and the result is returned to register R2. Switch 201-14 is conditioned to apply the address contents of return register 201-20 as a next address to control store 201-10. This causes the control store 201-10 to read out the next microinstruction in the sequence being executed before the branch took place.

During the next cycle of operation, the contents of the general register location specified by bits 9-12 (GR1) are read out into buffer 203-16. The value WL applied via B switch 204-1 is added to the IC contents applied via A switch 203-20 and the result is transferred to the IC working register of bank 204-12. The contents are also written into location GR1 of memory 203-10. Also, the incremented contents of the next address register 201-24 are loaded into return register 201-20 and the switch 201-14 is conditioned to apply the execution address contained in register 201-4 to control store 201-10.

The control store 201-10 branches to a location for read out of a microinstruction word of an execution sequence. The previous operations were carried out by the microinstructions of a standard sequence. For further information regarding the employment of standard and execution sequences, reference may be made to the previously referenced patent application "Pathfinder Microprogram Control System" invented by Garvin Wesley Patterson, et al.

Under control of the microinstruction of the execution sequence, processor pair 200-0 operates to generate a memory request (ZAC command) to local memory 500-4 specifying a write operation and apply the appropriate memory address obtained from either memory 204-4 or working register R2 via address switch 204-6, bus WRP and "cross bar" switch 204-8 to data out register 204-14. The adder/shifter 204-2 increments by 8 the contents of the IC working register and stores the result in working register R3. The processor 200 delays the execution of a next microinstruction until it receives a signal from memory acknowledging acceptance of the request. Also, switch 201-14 is conditioned to apply the address contents of return register 201-20 as a next address to control store 201-10.

Upon receipt of a signal from memory (i.e., line ARA is forced to a binary ONE), the control store 201-10 returns to the standard sequence and read out the contents of the next location. During this cycle of operation, the processor pair 200-0 transfers the data contents of general register GR1 to be written in memory, read out by the previous microinstruction via the A switch 203-20 through adder/shifter 204-2 and cross bar 204-8 into the data out register 204-14. Also, the updated contents of the IC working register are stored in scratch pad memory 203-10.

In the manner described above, the return address applied to control store 201-10 is also incremented by adder 201-22 and stored in next address register 201-24. Accordingly, absent any signals from register 201-15, the incremented contents of register 201-24 are applied via next address register position of switch 201-14 to control store 201-10. This conditions the control store 201-10 to read out the microinstruction stored in the next successive location.

During the next cycle, the processor pair 200-0 performs the operations indicated under control of the microinstruction read out. As mentioned, these operations involve the fetching of another instruction and the advance processing of the next instruction.

Figure 13:
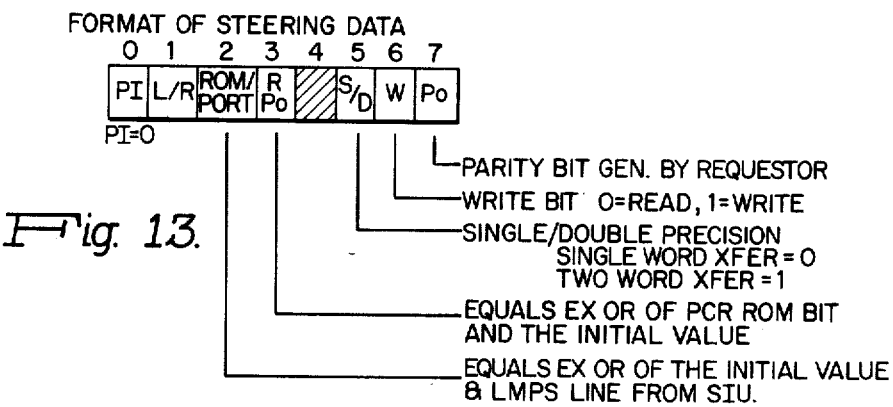
FIG. 13 illustrates the format of interrupt data.

Of importance to the present invention is the generation of steering data and the conditioning of steering switch 204-10 to provide appropriate SIU steering data having the format shown in FIG. 13 together with the ZAC command (see FIG. 7c). Referring to FIG. 2a, it is seen that the source of the steering bits is a page table word from scratch pad memory 204-4 (paged address)

or from an index register whose contents were added to a displacement value and stored in working register R2.

The state of bit position 10 of PSR register 204-20 defines the address mode (i.e., absolute = 0 or paged = 1). Bit 0 is switched to a binary ZERO for a memory command under microprogram control. Bit 1 of the steering data of FIG. 13 corresponds directly to the state of bit 0 of the PTW when paged or bit 0 of the index register in the case of an absolute address (i.e., signal STSWI1110). Bit 2 corresponds to the Exclusive OR of the LMPS line and bit of the index register for an absolute mode. Bit 3 corresponds to the Exclusive OR of PCR ROM bit 19 with bit 2 of the PTW when paged or bit 2 of the index register for an absolute address. It will be noted from FIG. 2a that the steering bits 2 and 3 are generated from the Exclusive OR circuits only when signal STSWI1110 is a binary ZERO (i.e., local memory references). When signal STSWI1110 is a binary ONE, the signals correspond to the output signals from switch 204-60 (i.e., from AND gates 204-76 and 204-86 for steering bits 2 and 3).

From the above, it is seen that by changing the state of bit 2 of an index register referenced during the address preparation operation, the state of steering bit 3 can be switched as a result of the Exclusive OR of that bit and PCR ROM bit 19. This will be explained in greater detail herein with reference to FIG. 14.

As concerns paged address preparation, the absolute address is developed by concatenating the page relative address and the page base address from the page table word (PTW) specified by the page number. The local/remote and steering fields in the absolute address are obtained from the PTW. For further information regarding the above, reference may be made to the co-pending patent applications "Method of Generating Addresses to a Paged Memory" and "Memory Steering in a Data Processing System" referenced in the introductory portion of the specification.

Figure 14:
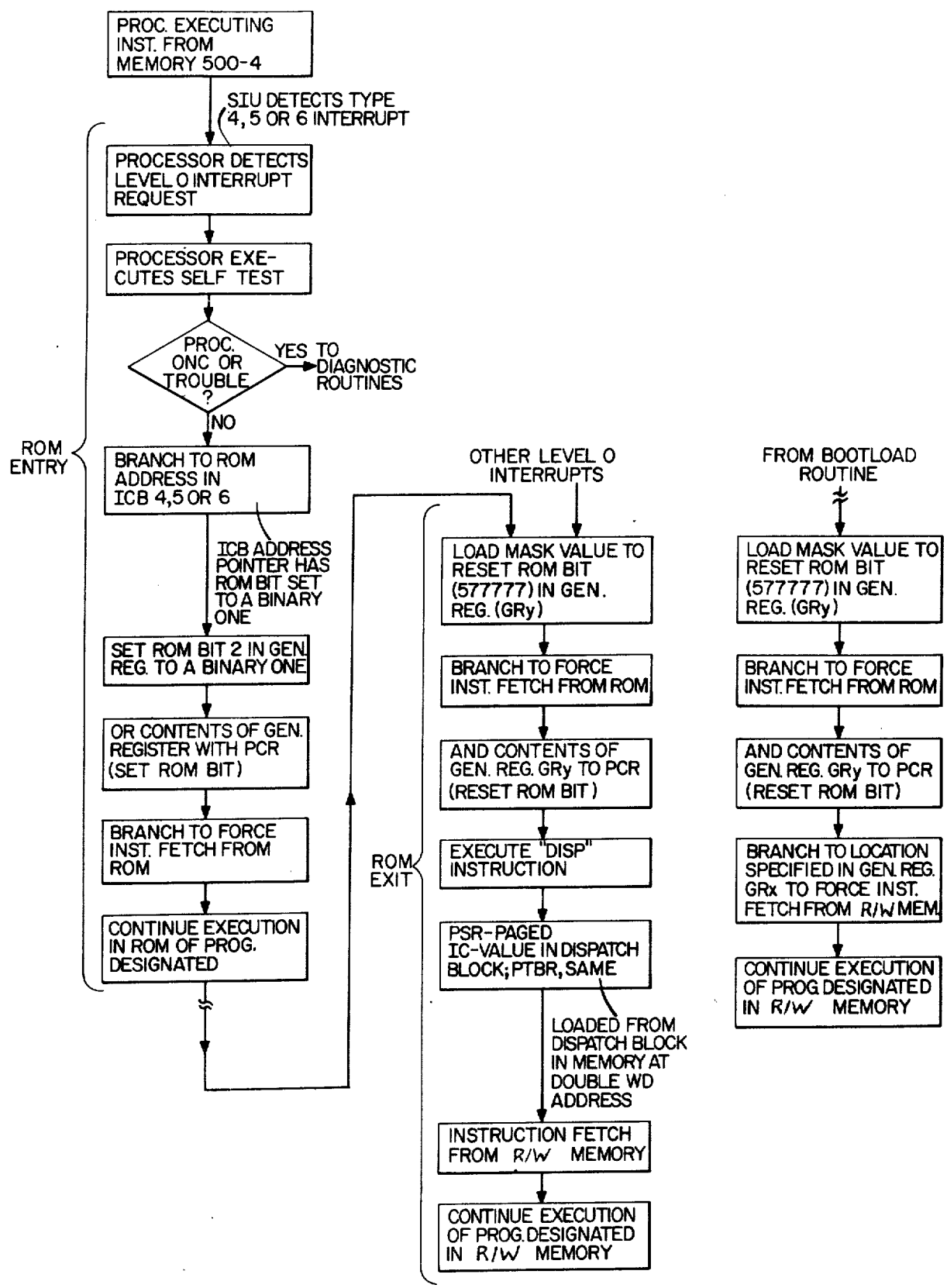
FIG. 14 is a flow diagram used in explaining the operation of the present invention.

Referring to FIG. 14, it is seen that an entry into a group of routines stored in ROM 500-2 designated as level 0 programs is initiated in response to an SIU detected processor errors. The three types of errors are designated as follows: a type 4, error without miscompare; a type 5, error with miscompare; and, a type 6, miscompare without errors. The SIU 100 detects a miscompare when there is a non-comparison between the sets of signals applied to output lines from each processor of a processor pair. For further information regarding the manner in which SIU 100 detects such errors, reference may be made to the patent application "Input/Ouput Processing System Utilizing Locked Processors" invented by John M. Woods, et al.

As seen from FIG. 14, one of the processors of pair P0 executes a self test operation. Assuming the test is successful, the processor accepts the interrupt request from SIU 100.

Depending upon the type of errors, the SIU 100 generated level 0 type 4, 5 or 6 request causes the processor to reference a corresponding one of the interrupt control blocks (i.e., ICB's 4, 5 and 6). The instruction counter IC (see FIG. 8c) in each ICB stores an address which points to the appropriate entry point in ROM 500-2. Steering bit position 2 of the IC is set to a predetermined state (a binary ONE) to force access to ROM 500-2 at the specified address.

More specifically, under microprogram control, the processor 200 generates a ZAC read command together with a type 6 request to SIU 100. The command is coded to specify a double word transfer from local memory while the appropriate address information and steering information is obtained from working register R3. Since bit 2 of the IC counter contents is a binary ONE and bit 19 of PCR register 204-22 is a binary ZERO, the circuits of FIG. 2a force signal STSWG3100 to a binary ONE. This specifies that instructions are fetched from ROM 502-2. During the execution of the first instruction, processor 200 immediately generates another ZAC command to fetch another double word from ROM 500-2.

Referring to FIG. 3d, it is seen that signal SLTM0100 is forced to a binary ONE when steering bit signal SDTS3100 from steering register 204-16 is a binary ONE (i.e., SIU 100 applies appropriate signals received via SDTS lines to the local memory SLTM lines. This switches flip-flop 500-70 to a binary ONE which initiates an ROM cycle. During the ROM cycle, the contents of the pair of locations specified by the address signals applied to the DTM lines are read and transmitted serially to processor pair P0 via the DFM lines (see FIG. 11a).

The first instruction fetched is from ROM 500-2 is an arithmetic instruction designated load lower immediate to GR (LDLI). This instruction has the format shown in FIG. 12a. The GR2 field is ignored and the long immediate operand I is sign extended and loaded into the specified general register location (Rx). The value stored is 0200000. This means that bit 19 of the general register location Rx is set to a binary ONE enabling the subsequent switching of ROM bit 19 to a binary ONE.

The next instruction is an OPC instruction having the format shown in FIG. 8b. It is this instruction which sets ROM bit 19 of PCR register 204-22 to a binary ONE. More specifically, the instruction field GR1 specifies general register Rx. During the standard sequence of microinstructions, the processor 200 is operative to transfer signals representative of the PCR register via switch 204-24 and 204-8 into working register R2.

In the manner previously described, processor 200 under microprogram control updates the IC and then references a microinstruction of the execution sequence. During the execution of this microinstruction, the Rx contents of buffer 203-16 are applied to the A operand inputs of adder 204-2 and the PCR contents of working register R2 are applied to the B operand inputs of adder 204-2 is conditioned to perform a logical OR operation upon the A and B operand signals and the result is stored in working register R1. The result has a binary ONE in bit 19.

Following a fetch operation (i.e., ZAC read command), the processor 200 returns via return address register 201-20 to the standard sequence. Next, the contents are transferred from register R1 to PCR register 204-22 via bus WRR. Only bit positions 18-22 and 28-34 are loaded with the inclusive OR result. This results in ROM bit 19 being set to a binary ONE with the remaining bits being unchanged.

Figure 12A:
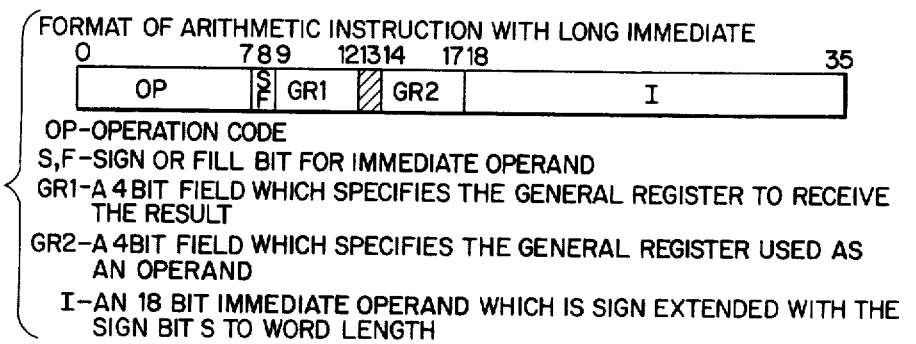
FIGS. 12a and 12b illustrate the formats of certain instructions.
Figure 12B:
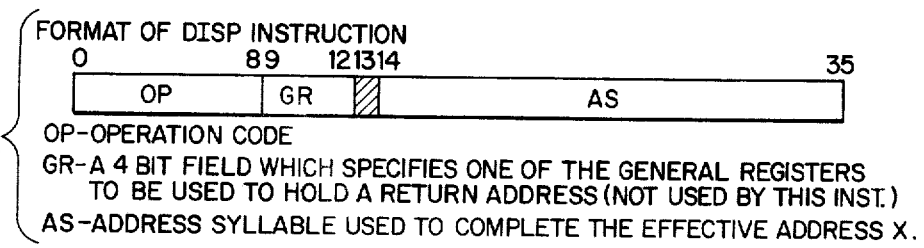

The next instruction to be processed is a branch instruction which has the format of FIG. 12b. As seen from FIG. 14, this instruction causes processor 200 to fetch instructions from ROM. That is, it enables the ROM bit to be placed in the proper state and the next instruction fetch to be directed to ROM 500-2. More specifically, a branch type instruction causes the bit set in the IC when the interrupt routine was entered (i.e., ICB had ROM bit set to a binary ONE) to be switched to a binary ZERO. If an instruction other than a branch instruction were executed, the steering bit and PCR bit 19 both being binary ONES when Exclusive ORed result in signal STSWG3100 being a binary ZERO causing instructions to be fetched from read/write memory 500-4.

Considering the above in greater detail, the processor 200, in response to the branch instruction, is operative under microprogram control to perform a standard sequence operation followed by adding the contents of the specified index register XR1 to the displacement value DL and storing the result in working register R2. The R2 register specifies the branch destination. Next, the contents of the specified second level index register XR2 are read out and when second level indexing is specified, the contents are added to the result stored in the R2 register. The result is again stored in the R2 register and control is returned to the standard sequence.

Another instruction fetch is performed. When the branch specifies storage of the IC, the processor 200 updates the IC contents by adding to it the value WL. The result is then stored in a general register location specified by instruction field GR1. Next, the processor 200 references an execution sequence during which the branch destination address stored in register R2 is loaded into the IC which is effective to transfer control to the IC address. This address specifies a branch to level 0, type X entry (i.e., X=4, 5 or 6 type entry). It will be noted that the new IC address has steering bit 2 set to a binary ZERO. Thus, this is effective to switch the corresponding bit in the IC from a binary ONE to a binary ZERO. With bit 19 of PCR register 204-22, a binary ONE, the Exclusive OR circuits of FIG. 2a force signal STSWG3100 to a binary ONE. Therefore, instructions will be fetched from ROM 500-2.

From the above, it is seen that switching from read/write memory 500-4 to ROM 500-2 simply requires that bit 19 of PCR register 204-22 be switched to a binary ONE and the modification of the steering bit contents of the IC. In the preferred embodiment, the modification of the IC steering bit is accomplished by a branch instruction which changes the value of the IC.

Referring to FIG. 14, it is seen that instructions will continue to be fetched from ROM 500-2. When it is desired to fetch instructions from read/write memory 500-4, a first sequence of operations illustrated in FIG. 14 is performed. The other sequence of operations is included as part of a "bootload" routine which is executed after a bootload operation, system initialization or the completion of diagnostic test routines.

During the execution of a last instruction, the processor 200 under microprogram control generates another ZAC read command which initiates another double word transfer from ROM 500-2. The first instruction executed is a LDLI instruction. The immediate operand (Ry) is coded to store the value 0577777. This value serves as a mask for resetting PCR bit 19 to a binary ZERO as explained herein. However, before switching bit 19, a branch instruction is executed. The branch destination specifies a predetermined address in ROM 500-2 (i.e., LyROM). This forces a double word instruction fetch ROM 500-2. This ensures that processor 200 is at the proper point within the program instructions under execution (i.e., next two instructions are fetched and an AND operation is performed at this time).

The first instruction in the fetch is an APC instruction located at LyROM which has the format shown in FIG. 8b. It is this instruction which resets ROM bit 19 of PCR register 204-20 to a binary ZERO. More specifically, the GR1 field of the instruction specifies general register Ry which has stored the value 0577777. During the standard sequence of microinstructions, processor 200 is operative to transfer signals representative of the contents of PCR register 204-24 via switches 204-24 and 204-8 into working register R2. After updating the IC, the processor 200 executes a microinstruction of an execution sequence which applies the Ry contents of buffer 203-16 to the A operand input of adder 204-2. It also applies the PCR contents of register R2 to the B operand inputs of adder 204-2. The microinstruction conditions adder 204-2. The microinstruction conditions adder 204-2 to perform a logical AND operation upon both operands and store the result in working register R1. The result has a binary ZERO in bit 19.

Following another fetch operation (i.e., a ZAC read command), the processor 200 returns via return address register 201-20 to the standard sequence. Next, the contents are transferred from register R1 to PCR register 204-22 via bus WRR. However, only bit positions 18-22 and 28-34 are loaded with the AND result. The octal value "577777" causes only ROM bit 19 to be reset to a binary ZERO with the remaining bits being unchanged.

The next instruction is a dispatch instruction which has the format shown in FIG. 12b. This instruction is coded to specify a fixed address in local memory 500-4. At this fixed address is stored the first word of a four word control block (dispatch block). This dispatch block is under the control of the operating system software. That is, its contents can be altered by such software thereby providing additional flexibility.

The block similar to the ECB contains values for the PSR, IC, GR14 and PTBR registers. As seen from FIG. 14, the processor 200 enters the routine specified by the contents of the dispatch block. That is, in response to the DISP instruction, the processor 200 loads the PSR information obtained from the dispatch block (word 1). The processor 200 also loads the IC, GR14 and PTBR registers with the information obtained from the dispatch block (words 2, 3 and 4).

As seen from FIG. 14, the appropriate bit in word 1 is set to a binary ONE indicating that the operation is paged (i.e., bit 10). This places the processor 200 in its normal mode of operation. With the new values obtained from the dispatch block, the processor 200 begins instruction fetches from read/write memory 500-4 at the location specified by the contents of the IC register.

The other sequence, as mentioned above, is entered following a bootload operation or after the initialization of the processor pair and transfer of control back to read/write memory 500-4. (See reference patent applications). As seen from FIG. 14, processor 200 executes a sequence of operations similar to that just discussed. However, the transfer to read/write memory 500-4 takes place via a branch instruction which is coded to specify the branch destination previously loaded into general register Ry (i.e., RETADR). This enables the processor 200 to branch to any desired location within read/write memory 500-4. It will be noted that in contrast to the first sequence such operations are performed in the mode of operation specified by the contents of the PSR register which remains unchanged.

The next instruction is a branch instruction which is coded to specify the branch destination previously loaded into general register Ry (i.e., RETADR). This enables the processor 200 to branch to any desired location within read/write memory 500-4.

It is seen from the foregoing that the switching from ROM 500-2 to read/write memory 500-4 as the source of instructions again takes advantage of the processor instruction fetch features. It should be noted that the APC instruction enables switching to the read/write memory 500-4 as the source of instructions similar to the OPC instruction enabling switching to ROM 500-2. It will be appreciated that these two instructions are only used when it is desired to discontinue completely fetching instructions from ROM 500-2 or read/write memory 500-4.

Since the system of FIG. 1 actually includes two ROM's and two read/write memories, the same arrangement can be used to switch between the memories of each local memory system. The only change required is to store appropriate steering bit values into the various general registers (i.e., Rx, Ry, etc.). Hence, the arrangement enables the processor 200 to execute instructions fetched from local memory LM0, ROM 500-2 and to load data into read/write memory 500-4a of local memory LM1.

It will also be appreciated that by changing the state of the ROM steering bit, it is possible to direct interrupts to read/write memory 500-4/500-4a or to ROM 500-2/500-2a utilizing different sets of control base blocks. When processor 200 is in the process of responding to an interrupt request or exception condition as explained in the previous referenced application, it is operative to first execute a LDLI instruction which loads a general register with an appropriate octal value required for switching the state of the steering bit (i.e., bit 13) of the CBBR. Next, the processor 200 executes a CRSG instruction having the format of FIG. 8b. This instruction copies the contents of the CBBR into another general register location. The contents of both general register locations are ORed together by an ORUI instruction. This instruction has the format of FIG. 12a and ORs the contents of the general register with the CBB1 value. The result which contains the modified steering bit (i.e., bit 13) is copied into general register GR0 of level 0 via a CGRS instruction (i.e., copies general register into scratch pad location). Both the CRSG and CGRS instructions are master mode instructions which precludes their execution by user or slave programs.

The above enables interrupt requests and exception conditions to be directed to the appropriate memories. For example, interrupt requests are normally directed to ROM 500-2 which stores the level 0 interrupt processing routines. Exception conditions are directed to read/write memory 500-4 in order to perform the required write operations (e.g. store status signals). Of course, when the appropriate memory is already being referenced, the memory steering need not be modified.

From the foregoing, it is seen how the arrangement of the present invention affords ease and memory flexibility of being able to switch between a number of memories with a minimum of additional apparatus. This facilitates management of memory resources and allocation of memory space. Also, the arrangement maintains system security by requiring that memory switching occurs only when the processor is operating in a privileged of master mode.

While in accordance with the provisions and statutes there has been illustrated and described the best forms of the invention known, certain changes may be made to the system described without departing from the spirit of the invention as set forth in the appended claims and, in some cases, certain features of the invention may be used to advantage without a corresponding use of other features.

What is claimed is:

1. An input/output system for controlling input/output operations involving a plurality of input/output devices, said system comprising:
   system interface means having a plurality of interface ports;
   a plurality of modules, each having an interface port and including means for generating commands to said system interface means along said port, said modules including at least one memory module and at least one processor module, said one memory module including:
   a read only memory operatively connected to one of said interface ports, said read only memory coded for storing a plurality of sequences of program instructions;
   a read/write memory operatively connected to said one of said interface ports, said read/write memory for storing instructions and data; and,
   control circuit means connected to said read only memory and to said read/write memory, said control circuit means being operative in response to said commands received from said processor module to enable said read only memory and read/write memory; and,
   said one processor module including:
   process control register means, including a number of bit positions for storing control information required for processing instructions of a current program under execution, a predetermined one of said bit positions for designating when said read only memory is to be accessed;
   microprogrammed control means for storing sequences of microinstruction words for generating control signals for directing the operation of said one processor module;
   address control means coupled to said microprogrammed control means for generating in response to said control signals address and coded identification information included as part of each of said commands transferred to said port to be used for accessing said memory module; and,
   logic means coupled to said process control register means and to said address control means, said logic means being conditioned by the content of said predetermined one of said process control bit positions to modify said coded identification information received from said address control means for each generated memory command in accordance with the coding of said predetermined process control bit; and,
   said control circuit means being conditioned by said modified coded identification information of said each command to enable selective switching between said read only memory and read/write memory.

2. The system of claim 1 wherein said coded identification information includes a plurality of steering bits and said logic means includes first gating means, said first gating means being connected to receive a first signal corresponding to the state of said predetermined one of said process control register bit positions and a second signal corresponding to one of a plurality of steering bits coded for designating when said read only memory is to be accessed, said first gating means being conditioned by said first and second signals to produce an output signal corresponding to the exclusive OR of said first and second signals for enabling said switching between said read/write memory and said read only memory.

3. The system of claim 2 wherein said processor module includes a plurality of registers for storing information required for processing said instructions and wherein a number of memory instructions stored in said read only memory and said read/write memory specify access to said memory module, each of said number of instructions being coded to have a predetermined format specifying the referencing of one of said registers, said microprogrammed control means being operative in response to each said memory instruction to generate control signals for conditioning said address control means to generate an address and said one of said steering bits from the contents of said one of said registers, and said logic means being conditioned by the state of said one steering bit and said first signal to switch the state of said output signal for designating access to other than the memory specified by said first signal.

4. The system of claim 2 wherein said first and second signals correspond to the negation and assertion respectively for conditioning said first gating means to force said output signal to a binary ONE state in response to said one of said steering bits to enable access to said read only memory when said state of said predetermined one of said process control register bit positions is coded to designate that said read/write memory is being accessed.

5. The system of claim 2 wherein said predetermined one of said process control bit positions is in a state specifying access to said read/write memory and wherein said processor module includes a number of control registers, at least one of said registers storing an address specifying a predetermined one of said plurality of sequences and identification information in which said one of said plurality of steering bits is coded to be in a predetermined state for designating access to said read only memory, said microprogrammed control means being operative to generate control signals for conditioning said address control means to include said address and identification information from said one register in a command for accessing said memory module, and said logic means being conditioned by said one of said steering bits and said state of said predetermined one of said process control bit positions to apply said one of said steering bits from said address control means without modification to said memory module to force access to said read only memory for referencing said predetermined one of said sequences.

6. The system of claim 5 wherein said one register is an interrupt control register for transferring control from said read/write memory to said read only memory during the processing of interrupts.

7. The system of claim 5 wherein said predetermined state corresponds to a binary ONE state.

8. The system of claim 5 wherein said predetermined one of said plurality of sequences including at least a first type of logic instruction and a branch instruction, said logic instruction being coded to specify a logical operation upon the contents of said process control register bit positions and said branch instruction being coded to specify instruction fetches from a desired point in said read only memory, said microprogrammed control means being operative in response to said logic and branch instructions to generate control signals for performing said logical operation for switching said one of said process control register bit positions to said predetermined state and for forcing said processor module to fetch instructions from said read only memory at said point specified by said branch instruction.

9. The system of claim 8 wherein said number of control registers include a plurality of registers for storing information required for the processing of said instructions and wherein said predetermined one of said plurality of sequences further includes a load type instruction, said load type instruction being coded to include a constant containing a predetermined value to be loaded into one of said plurality of registers and said logic instruction being coded to specify said logical operation to be performed upon at least a portion of the contents of said process control register bit positions and said one of said plurality of registers, said microprogrammed control means being operative in response to said load instruction and said logic instruction to generate control signals for conditioning said processor module to load said constant into said one register and perform said logical operation upon the constant contents of said one register and said contents of said process control register storing the result of said logical operation in said process control register.

10. The system of claim 9 wherein said logical operation is an inclusive OR operation and wherein said value of said constant is 0200000 octal.

11. The system of claim 2 wherein said predetermined one of said process control bit positions is in a state specifying access to said read only memory and wherein said read/write memory including a dispatch block including a plurality of storage locations coded to include a number of constant values to be loaded into predetermined ones of said number of control registers, and said processor module including a number of control registers for storing information required for processing said instructions, one of said plurality of sequences of program instructions including a second type of logic instruction and a control instruction, said second type of logic instruction being coded to specify a logical operation upon said process control register bit positions and said control instruction being coded to specify dispatching a program designated by the contents of said dispatch block, said microprogrammed control means being operative in response to said logic and control instructions to generate control signals for performing said logical operation for switching said one of said process control registers from said state to another state specifying access to said read/write memory and for forcing said processor module to load said constant values into said predetermined ones of said number of control registers for dispatching said program.

12. The system of claim 11 wherein said one of said plurality of sequences further includes a branch instruction, said branch instruction being coded to specify an address for referencing said logic and control instructions, and said microprogrammed control means being operative in response to said branch instruction to generate control signals for conditioning said address control means to generate a memory command specifying fetching instructions from said read only memory beginning with said logic instruction to ensure that said processor module is at the proper point within said instructions.

13. The system of claim 12 wherein said one sequence includes a load type instruction, said load type instruction being coded to include a constant containing a predetermined value to be loaded into one of said number of control registers and said logic instruction being coded to specify said logical operation to be performed upon at least a portion of said process control register bit positions and said one of said plurality of registers, said microprogrammed control means being operative in response to said load instruction and said logic instruction to generate control signals for conditioning said processor module to load said constant into said one register and perform said logical operation upon the constant contents of said one register and said contents of said process control register storing the result of said logical operation in said process control register.

14. The system of claim 13 wherein said logical operation is an AND operation and wherein said constant predetermined value is 0577777 octal.

15. The system of claim 13 wherein one of said number of control registers includes information defining the state of said processor module, said processor module being operative to execute said second type logic instruction and said control instruction only when said information designates said state of said processor module as being privileged.

16. An input/output system for controlling input/output operations involving a plurality of input/output devices, said system comprising:

system interface means having a plurality of interface ports;

a plurality of modules, each having an interface port and including means for generating commands to said system interface means along said port, said modules including at least one memory module and at least one processor, said one memory module including:

a plurality of memories, a first memory operatively connected to one of said interface ports, said first memory coded for storing a plurality of sequences of unmodifiable program instructions;

a second memory operatively connected to said one of said interface ports, said second memory for storing instructions and data; and, control circuit means connected to said first memory and to said second memory, said control circuit means being operative in response to said commands from said processor module to enable said first memory and second memory; and, said one processor including:

process control register means, including a number of bit positions for storing control information required for processing instructions of a current program under execution, a predetermined one of said bit positions for designating when said first memory is to be accessed;

microprogrammed control means for storing sequences of microinstruction words for generating control signals for directing the operation of said one processor;

address control means coupled to said microprogrammed control means for generating in response to said control signals address and coded steering information included as part of each of said commands to be used for accessing different ones of said plurality of memories of said memory module; and, logic means coupled to said process control register means and to said address control means, said logic means being conditioned by the content of said predetermined one of said process control bit positions to modify said coded steering information portion received from said address control means for each generated memory command in accordance with the coding of said predetermined process control bit; and, said control circuit means being conditioned by said modified coded steering information of said each command to enable selective switching between said first and second memories.

17. The system of claim 16 wherein said coded steering information includes a plurality of steering bits and said logic means includes first gating means, said first gating means being connected to receive a first signal corresponding to the state of said predetermined one of said process control register bit positions and a second signal corresponding to one of a plurality of steering bits coded for designating when said first memory is to be accessed, said first gating means being conditioned by said first and second signals to produce an output signal corresponding to the exclusive OR of said first and second signals for enabling said switching between said first memory and said second memory.

18. The system of claim 17 wherein said processor includes a plurality of registers for storing information required for processing said instructions and wherein said plurality of memories each include a number of instructions specifying access to said memory module, each of said number of instructions being coded to have a predetermined format specifying the referencing of one of said registers, said microprogrammed control means being operative in response to each said memory instruction to generate control signals for conditioning said address control means to generate an address and said one of said steering bits from the contents of said one of said registers, and said logic means being conditioned by the state of said one steering bit and said first signal to switch the state of said output signal for designating access to other than the memory specified by said first signal.

19. The system of claim 17 wherein said predetermined one of said process control bit positions is in a state specifying access to said first memory and wherein said processor includes a number of control registers, at least one of said registers storing an address specifying a predetermined one of said plurality of sequences and identification information in which said one of said plurality of steering bits is coded to be in a predetermined state for designating access to said first memory, said microprogrammed control means being operative to generate control signals for conditioning said address control means to include said address and identification information from said one register in a command for accessing said memory module, and said logic means being conditioned by said one of said steering bits and said state of said predetermined one of said process control bit positions to apply said one of said steering bits from said address control means without modification to said memory module to force access to said first memory for referencing said predetermined one of said sequences.

20. An input/output system for controlling input/output operations involving a plurality of input/output devices, said system comprising:

system interface means having a plurality of interface ports;

a plurality of modules, each having an interface port and including means for generating commands to said system interface means along said port, said modules including at least two memory modules and at least one processor, each of said memory modules including:

an addressable semipermanent memory operatively connected to one of said interface ports, said memory having a plurality of locations for storing a plurality of sequences of program instructions;

an addressable writable memory operatively connected to said one of said interface ports, said memory having a plurality of locations for storing instructions and data; and, control circuit means connected to said semipermanent memory and to said writable memory, said control circuit means being operative in response to said commands from said processor module to enable selectively said memories; and, said one processor including:

process control register means, including a number of bit positions for storing control information required for processing instructions of a current program under execution, a predetermined one of said bit positions for designating when said semipermanent memory is to be accessed;

microprogrammed control means for storing sequences of microinstruction words for generating control signals for directing the operation of said one processor;

arithmetic and logic control means coupled to said microprogrammed control means for generating in response to said control signals from read out of certain sequences of microinstruction words in response to certain instructions, commands including address and coded steering information for accessing said memory module; and, logic means coupled to said process control register means and to said arithmetic and logic means, said logic means being conditioned by the content of said predetermined one of said process control bit positions to modify said coded steering information received from said arithmetic and logic control means for each generated memory command in accordance with the coding of said predetermined process control bit; and, said control circuit means being conditioned by said modified coded steering information of said each command to enable selective switching between said memories of each said module.

21. The system of claim 20 wherein said coded steering information includes a plurality of steering bits and said logic means includes first gating means, said first gating means being connected to receive a first signal corresponding to the state of said predetermined one of said process control register bit positions and a second signal corresponding to one of a plurality of steering bits coded for designating when said semipermanent memory is to be accessed, said first gating means being conditioned by said first and second signals to produce an output signal corresponding to the exclusive OR of said first and second signals for enabling said switching between said memories.

22. The system of claim 21 wherein said logic means further includes second gating means, said second gating means being connected to apply to said memory modules a third signal corresponding to another one of said plurality of steering bits coded for designating which one of said number of memory modules is to be accessed and control circuit means of the designated memory module being conditioned by said output signal to enable switching between said memories of said modules.

23. The system of claim 21 wherein said processor includes a plurality of registers for storing information required for processing said instructions and wherein each of said memories includes a number of memory instructions for specifying access to said memory module, each of said number of instructions being coded to have a predetermined format specifying the referencing of one of said registers, said microprogrammed control means being operative in response to each said memory instruction to generate control signals for conditioning said arithmetic and logic control means to generate an address and said one of said steering bits from the contents of said one of said registers, and said logic means being conditioned by the state of said one steering bit and said first signal to switch the state of said output signal for designating access to other than the memory specified by said first signal.

24. The system of claim 21 wherein said predetermined one of said process control bit positions is in a state specifying access to said writable memory and wherein said processor includes a number of control registers, at least one of said registers storing an address specifying a predetermined one of said plurality of sequences and steering information in which said one of said plurality of steering bits is coded to be in a predetermined state for designating access to said semipermanent memory, said microprogrammed control means being operative to generate control signals for conditioning said arithmetic and logic control means to include said address and steering information from said one register in a command for accessing said memory module, and said logic means being conditioned by said one of said steering bits and said state of said predetermined one of said process control bit positions to apply said one of said steering bits from said arithmetic and logic control means without modification to said memory module to force access to said semipermanent memory for referencing said predetermined one of said sequences.

25. The system of claim 24 wherein said semipermanent memory includes an entry and exit sequence of instructions, said entry and exit sequences each including a logic instruction and a branch instruction, said logic instruction being coded to specify a logical operation upon the contents of said process control register positions and said branch instruction being coded to specify instruction fetches from a desired point in one of said memories, said microprogrammed control means being operative in response to said logic and branch instructions to generate control signals for performing said logical operation for switching said one of said process control bit positions to a predetermined state and for forcing said processor to fetch instructions from said one of said memories at said point specified by said branch instruction.

26. The system of claim 25 wherein said logic instruction of said entry sequence specifies a logical operation complementary to the logical operation specified by logic instruction of said exit sequence.

27. The system of claim 26 wherein said logical operation of said logic instruction of said entry sequence is an OR operation and said logical operation of said logic instruction of said exit sequence is an AND operation.

* * * * *